(12) United States Patent
Hedayat et al.

(10) Patent No.: US 8,001,850 B2
(45) Date of Patent: *Aug. 23, 2011

(54) SENSOR SYSTEM INCLUDING A MAGNETIZED SHAFT

(75) Inventors: Kayvan Hedayat, Weston, MA (US); Norman Poirier, Raynham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/547,077

(22) Filed: Aug. 25, 2009

(65) Prior Publication Data

US 2010/0077869 A1    Apr. 1, 2010

Related U.S. Application Data

(60) Division of application No. 12/345,148, filed on Dec. 29, 2008, now Pat. No. 7,895,906, which is a division of application No. 11/552,120, filed on Oct. 23, 2006, now Pat. No. 7,469,604, and a continuation-in-part of application No. 11/270,049, filed on Nov. 9, 2005, now Pat. No. 7,363,827.

(60) Provisional application No. 60/729,383, filed on Oct. 21, 2005.

(51) Int. Cl.
*G01L 3/00* (2006.01)
(52) U.S. Cl. ............... 73/862.333; 73/862.331
(58) Field of Classification Search ........... 73/862.331–862.336
See application file for complete search history.

(56) References Cited

U.S. PATENT DOCUMENTS

| | | | |
|---|---|---|---|
| 2,511,178 A | 6/1950 | Roters |
| 2,521,905 A | 9/1950 | Feller |
| 2,895,331 A | 7/1959 | Dahle |
| 3,083,353 A | 3/1963 | Bobeck |
| 3,274,826 A | 9/1966 | Ingram |
| 3,426,588 A | 2/1969 | Duda |
| 3,427,872 A | 2/1969 | Leep et al. |
| 3,537,304 A | 11/1970 | Brewer |
| 3,932,112 A | 1/1976 | Garshelis |
| 3,939,448 A | 2/1976 | Garshelis |
| 3,959,751 A | 5/1976 | Garshelis |
| 3,961,297 A | 6/1976 | Garshelis |
| 4,012,959 A | 3/1977 | Garshelis |

(Continued)

FOREIGN PATENT DOCUMENTS

EP    0136086    4/1985

(Continued)

OTHER PUBLICATIONS

Chinese Office Action dated Apr. 30, 2010 issued in related Chinese Patent Application No. 200680047749.5.

(Continued)

*Primary Examiner* — Lisa Caputo
*Assistant Examiner* — Jonathan Dunlap
(74) *Attorney, Agent, or Firm* — Grossman, Tucker, Perreault & Pfleger, PLLC

(57) ABSTRACT

A sensor includes a shaft and a magnetic sensor. The shaft may have at least one magnetized active region. The magnetic sensor may be configured to sense a magnetic field about the shaft, and may provide an output representative of torque applied to the shaft, shaft rotational speed and/or shaft rotational position.

17 Claims, 19 Drawing Sheets

U.S. PATENT DOCUMENTS

| | | |
|---|---|---|
| 4,188,572 A | 2/1980 | Garshelis |
| 4,319,189 A | 3/1982 | Cullum, Jr. et al. |
| 4,335,608 A | 6/1982 | Wood et al. |
| 4,416,161 A | 11/1983 | Barkhoudarian |
| 4,523,482 A | 6/1985 | Barkhoudarian |
| 4,596,150 A | 6/1986 | Kuhr |
| 4,627,298 A | 12/1986 | Sahashi et al. |
| 4,760,745 A | 8/1988 | Garshelis |
| 4,805,466 A | 2/1989 | Schiessle et al. |
| 4,851,771 A * | 7/1989 | Ikeda et al. ............... 324/207.21 |
| 4,872,350 A | 10/1989 | Kimura |
| 4,881,414 A * | 11/1989 | Setaka et al. .............. 73/862.331 |
| 4,882,936 A | 11/1989 | Garshelis |
| 4,896,544 A | 1/1990 | Garshelis |
| 4,950,988 A | 8/1990 | Garshelis |
| 5,052,232 A | 10/1991 | Garshelis |
| 5,239,490 A * | 8/1993 | Masaki et al. ................... 702/41 |
| 5,351,555 A | 10/1994 | Garshelis |
| 5,367,257 A | 11/1994 | Garshelis |
| 5,465,627 A | 11/1995 | Garshelis |
| 5,520,059 A | 5/1996 | Garshelis |
| 5,589,769 A | 12/1996 | Krahn |
| 5,591,925 A | 1/1997 | Garshelis |
| 5,706,572 A | 1/1998 | Garshelis |
| 5,708,216 A | 1/1998 | Garshelis |
| 5,750,230 A * | 5/1998 | Ishikawa et al. ............ 428/848.2 |
| 5,789,090 A | 8/1998 | Okumura et al. |
| 5,887,335 A | 3/1999 | Garshells |
| 5,889,215 A | 3/1999 | Kilmartin et al. |
| 5,912,521 A * | 6/1999 | Ray .......................... 310/156.06 |
| 6,047,605 A | 4/2000 | Garshelis |
| 6,057,021 A | 5/2000 | Ishikawa et al. |
| 6,097,183 A | 8/2000 | Goetz et al. |
| 6,098,468 A | 8/2000 | Mohri et al. |
| 6,145,387 A | 11/2000 | Garshelis |
| 6,147,487 A * | 11/2000 | Sugitani ................... 324/207.21 |
| 6,220,105 B1 | 4/2001 | Cripe |
| 6,260,423 B1 | 7/2001 | Garshelis |
| 6,346,812 B1 | 2/2002 | May |
| 6,360,773 B1 | 3/2002 | Rhodes |
| 6,360,841 B1 | 3/2002 | Blandino et al. |
| 6,372,338 B1 | 4/2002 | Jeffers et al. |
| 6,465,975 B1 * | 10/2002 | Naidu .......................... 318/430 |
| 6,467,360 B1 * | 10/2002 | Bogdanov ................. 73/862.333 |
| 6,490,934 B2 | 12/2002 | Garshelis |
| 6,509,732 B1 | 1/2003 | Rhodes et al. |
| 6,513,395 B1 * | 2/2003 | Jones ....................... 73/862.333 |
| 6,520,274 B1 | 2/2003 | McElmeel, Jr. et al. |
| 6,553,847 B2 | 4/2003 | Garshelis |
| 6,554,095 B2 | 4/2003 | Zheng et al. |
| 6,581,480 B1 * | 6/2003 | May et al. ................. 73/862.333 |
| 6,655,471 B2 | 12/2003 | Cripe et al. |
| 6,674,280 B1 | 1/2004 | Goetz et al. |
| 6,701,792 B2 | 3/2004 | Laidlaw |
| 6,707,292 B2 | 3/2004 | Viola |
| 6,758,105 B2 | 7/2004 | Viola et al. |
| 6,761,229 B2 | 7/2004 | Cripe et al. |
| 6,765,357 B2 | 7/2004 | Cripe et al. |
| 6,792,817 B2 | 9/2004 | Viola et al. |
| 6,807,871 B1 * | 10/2004 | Paek ......................... 73/862.339 |
| 6,823,746 B2 | 11/2004 | Viola et al. |
| 6,864,662 B2 | 3/2005 | Recker |
| 6,871,555 B2 * | 3/2005 | May ......................... 73/862.333 |
| 6,910,391 B1 * | 6/2005 | May ......................... 73/862.333 |
| 6,959,612 B2 * | 11/2005 | May ......................... 73/862.331 |
| 7,024,946 B2 * | 4/2006 | Nehl et al. ................ 73/862.333 |
| 7,055,399 B2 | 6/2006 | Viola |
| 7,124,649 B2 * | 10/2006 | May ......................... 73/862.331 |
| 7,140,258 B2 * | 11/2006 | May .................................. 73/779 |
| 7,145,326 B2 | 12/2006 | Rhodes et al. |
| 7,243,557 B2 * | 7/2007 | May ......................... 73/862.331 |
| 7,302,867 B2 * | 12/2007 | May ......................... 73/862.331 |
| 7,363,827 B2 | 4/2008 | Hedayat et al. |
| 7,469,604 B2 | 12/2008 | Hedayat et al. |
| 7,663,360 B2 * | 2/2010 | Matsumoto et al. ..... 324/207.25 |
| 2001/0035056 A1 * | 11/2001 | Garshelis ................. 73/862.336 |
| 2003/0115971 A1 | 6/2003 | Thomas |
| 2003/0115972 A1 | 6/2003 | May |
| 2003/0150282 A1 * | 8/2003 | May ......................... 73/862.331 |
| 2004/0031332 A1 * | 2/2004 | May ......................... 73/862.335 |
| 2005/0061088 A1 * | 3/2005 | May ......................... 73/862.331 |
| 2006/0028203 A1 * | 2/2006 | Kawashima et al. ..... 324/207.25 |
| 2006/0123903 A1 * | 6/2006 | Gandel et al. ..................... 73/328 |
| 2007/0034021 A1 * | 2/2007 | Cripe ........................ 73/862.331 |
| 2008/0116881 A1 * | 5/2008 | May ......................... 324/207.12 |
| 2008/0122308 A1 * | 5/2008 | Mleux .......................... 310/90.5 |
| 2009/0107257 A1 * | 4/2009 | May ........................... 73/862.08 |

FOREIGN PATENT DOCUMENTS

| | | |
|---|---|---|
| EP | 0330311 | 8/1989 |
| EP | 0525551 | 2/1993 |
| EP | 1274974 | 1/2003 |
| JP | 59181575 | 10/1984 |
| JP | 61195323 | 8/1986 |
| JP | SHO 62206421 | 9/1987 |
| JP | 03081629 | 4/1991 |
| JP | 03282337 | 12/1991 |
| JP | 03282338 | 12/1991 |
| JP | 04024530 | 1/1992 |
| SU | 708181 | 5/1980 |
| WO | 9533982 | 12/1995 |
| WO | 9626420 | 8/1996 |
| WO | 9852063 | 11/1998 |
| WO | 9956099 | 11/1999 |
| WO | 0113081 | 2/2001 |
| WO | 0113082 | 2/2001 |
| WO | 0127584 | 4/2001 |
| WO | 2005064281 | 7/2005 |
| WO | 2005064301 | 7/2005 |
| WO | 2005064302 | 7/2005 |
| WO | 2005064303 | 7/2005 |
| WO | 2005064623 | 7/2005 |

OTHER PUBLICATIONS

International Search Report and Written Opinion dated Aug. 23, 2007 issued in related International Patent Application No. PCT/US06/60169.

Petridis, "Negative Magnetostrictive Delay Lines Used in Sensing Applications", Journal of Optoelectronics and Advanced Materials, vol. 6, No. 2, Jun. 2004, pp. 593-598 (6 pages).

Garshelis, "A Study of the Inverse Wiedemann Effect on Circular Remanence", IEEE Transactions on Magnetics, vol. Mag-IO, No. 2, Jun. 1974, pp. 344-358 (15 pages).

Boley, et al., "Effects of Heat-Treatment on Sensitivity" "Production of a Torque Sensor" Magnetoelastic Research Group Western Illinois University Department of Physics (3 pages), Mar. 4, 2005.

Ramsden, "Ten Easy Things to do with Magnetic Sensors," Sensors Magazine, Mar. 1997 (6 pages).

Chinese Office Action dated Mar. 16, 2011 issued in related Chinese Patent Application No. 200680047749.5.

* cited by examiner

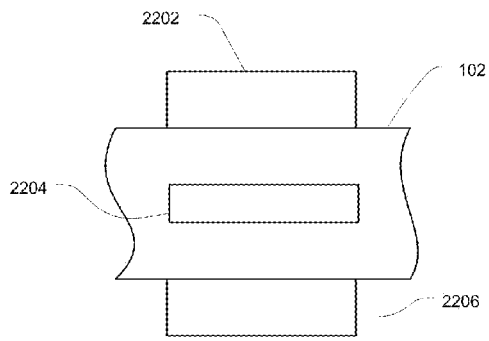
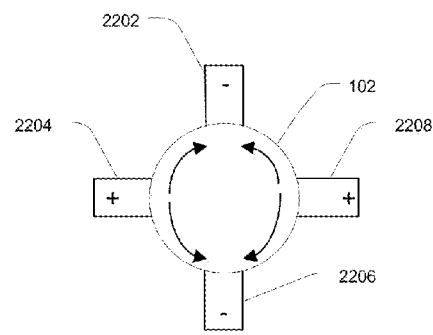
FIG. 22   FIG. 22A
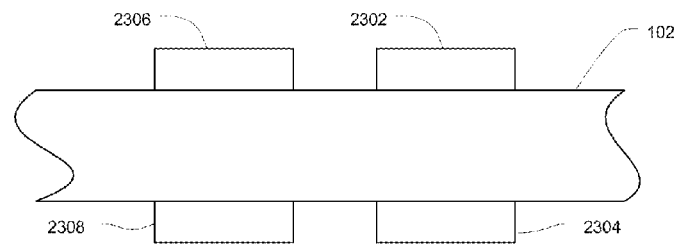
FIG. 23
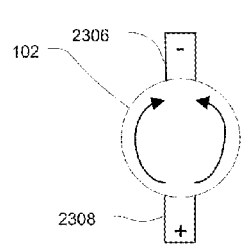
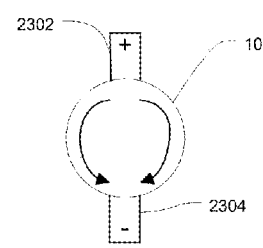
FIG. 23A   FIG. 23B
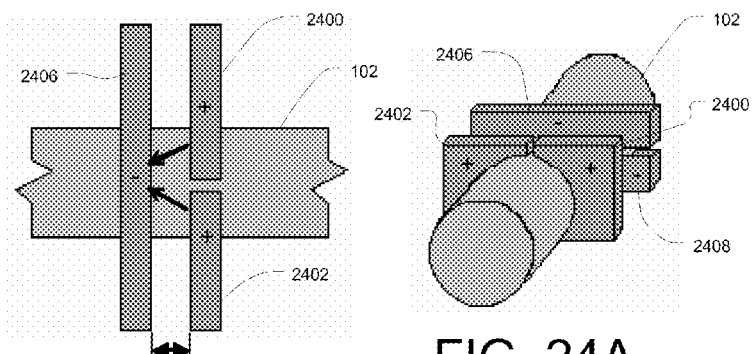
FIG. 24   FIG. 24A

SENSOR SYSTEM INCLUDING A MAGNETIZED SHAFT

CROSS-REFERENCE TO RELATED APPLICATIONS

The present application is a continuation-in-part of co-pending U.S. patent application Ser. No. 12/345,148, filed Dec. 29, 2008, which is a divisional of U.S. application Ser. No. 11/552,120, filed Oct. 23, 2006, now U.S. Pat. No. 7,469,604 which claims the benefit of the filing date of U.S. Provisional Application Ser. No. 60/729,383, filed Oct. 21, 2005, and is a continuation-in-part of U.S. application Ser. No. 11/270,049, filed Nov. 9, 2005, now U.S. Pat. No. 7,363,827, the entire teachings of which applications are hereby incorporated herein.

TECHNICAL FIELD

This disclosure relates to sensors, and more particularly to a sensor system including a magnetized shaft.

BACKGROUND

In the control of systems having rotating shafts, torque is a fundamental parameter of interest. Accordingly, sensors for sensing the torque applied to a rotating shaft have been developed. Sensors that do not contact the rotating shaft are desirable. Non-contact sensors may create and/or monitor a magnetic field about a rotating shaft that is proportional to the torque applied to the shaft.

In one known configuration, the rotating shaft, or one or more axial portions thereof, may be circumferentially magnetized, i.e., magnetically polarized in single direction following a circular path coaxial with the axis of the shaft. When the shaft is under zero torque, the magnetic field established by the shaft does not include a component in the direction of the shaft axis. When torque is applied to the shaft, the circumferential magnetic field becomes increasingly helical with increasing torque. The helical magnetization resulting from the applied torque includes an axial component in the direction of the axis of the shaft and a circumferential component. The axial component may be directly proportional to the applied torque. A magnetic sensor located proximate the shaft may detect the axial component and provide an output indicative of the level of torque applied to the shaft.

Proper magnetization of the shaft in such an embodiment is critical to operation. Manufacturing errors in magnetizing the shaft or in assembling the shaft in the system, can lead to a complete failure of the sensor system. Also, the shaft magnetization may weaken over time. However, the lack of a sensible axial field component when the shaft is at zero torque does not allow a simple, passive external means for determining if the shaft is magnetized properly or even magnetized at all.

One known approach to providing a sensor having a quiescent axial magnetic field at zero torque involves circumferentially magnetizing a shaft while the shaft is under a predetermined torque. Since the circumferential field is induced in the presence of the predetermined torque, a non-measurable axial field component occurs at the torque applied during magnetization, and when the torque on the shaft is removed the circumferential field is skewed resulting in a quiescent axial field component. Although such a configuration allows diagnostics at zero torque, it also suffers from several deficiencies. For example, magnetizing the shaft under a predetermined torque is a cumbersome and expensive process that does not allow facile large volume production.

In addition, a circumferentially magnetized configuration may only allow for measurement of torque, and not position or speed. In some applications it may be desirable for the sensor to also, or alternatively, provide position and/or speed sensing with the same set of electronics.

Accordingly, there is a need for a sensor system including a magnetized shaft providing a measurable axial field component at zero torque that may be efficiently and cost-effectively produced. There is also a need for a sensor system including a magnetized shaft that provides sensing of torque, position, and/or speed.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which:

FIG. 22 is a side view of a shaft and electrode clamps illustrating another system and method of magnetizing a shaft consistent with the present disclosure;

FIG. 22A is a radial sectional view of the embodiment of FIG. 22 taken through the electrode clamp assemblies;

FIG. 23 is a top view of a shaft and electrode clamps illustrating another system and method of magnetizing a shaft consistent with the present disclosure;

FIG. 23A is a radial sectional view of the embodiment of FIG. 23 taken through a first pair of the electrode clamp assemblies;

FIG. 23B is a radial sectional view of the embodiment of FIG. 23 taken through a second pair of the electrode clamp assemblies;

FIG. 24 is a top view of a shaft and electrode clamps illustrating another system and method of magnetizing a shaft consistent with the present disclosure;

FIG. 24A is a perspective view of the embodiment of FIG. 24;

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

The description provided herein is with reference to various exemplary embodiments. It is to be understood that the embodiments described herein are presented by way of illustration, not of limitation. A configuration consistent with the present disclosure may be incorporated into a wide variety of systems without departing from the spirit and scope of the disclosure.

Figure 1:
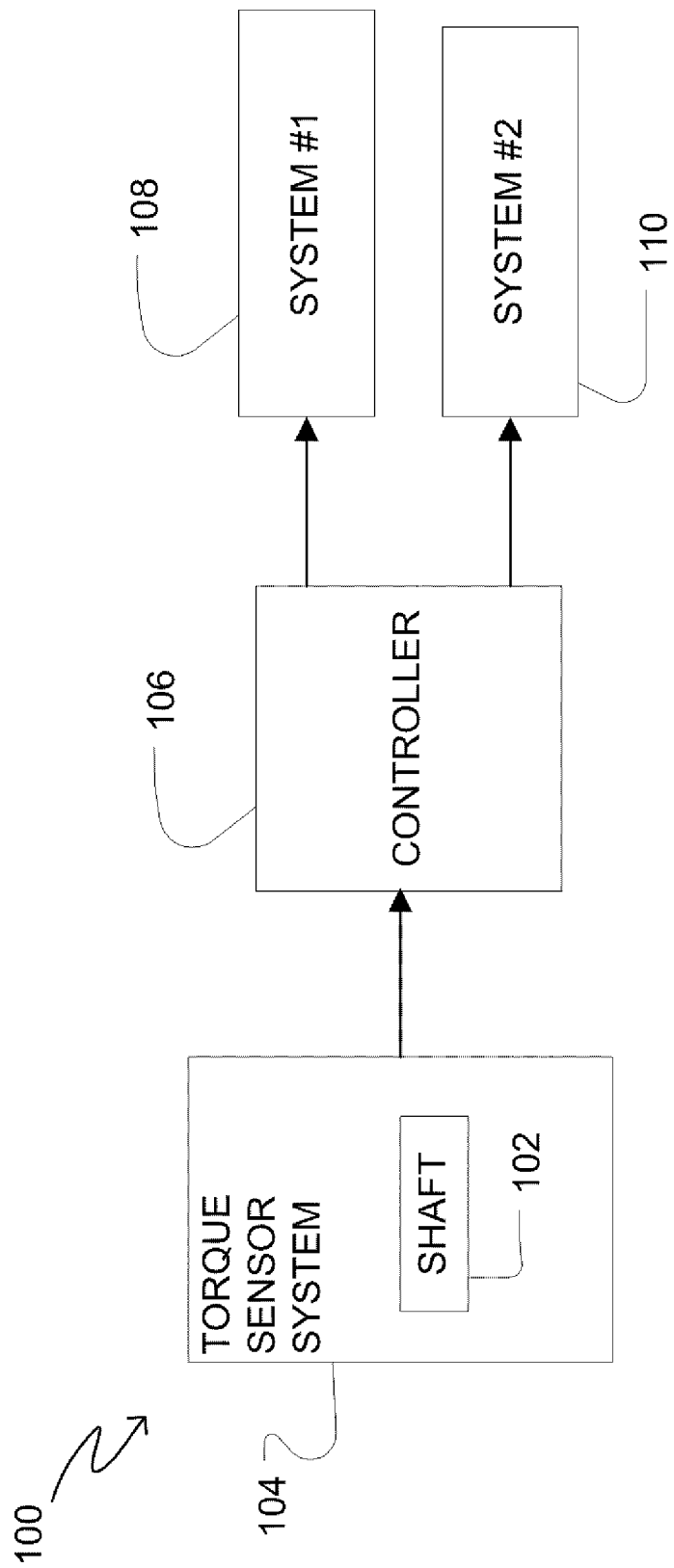
FIG. 1 is a block diagram of an exemplary system consistent with the present disclosure.

Turning now to FIG. 1, there is shown in block diagram form one exemplary embodiment of a system 100 including a sensor 104. As shown, the system 100 may include a controller 106 and one or more systems 108 and 110 controlled by the controller 106. The sensor 104 may monitor the torque applied to the shaft 102. In one exemplary embodiment, the shaft 102 may be coupled, to or form a portion of, a power take-off shaft of a tractor. An output representative of the torque applied to the power take-off may be coupled from the sensor 104 to the controller 106. The controller may be a microcontroller, e.g. including an appropriately programmed microprocessor and associated memory, configured to control the systems 108 and 110 in response to the sensor output.

In another exemplary embodiment, the shaft 102 may be coupled to, or form a portion of, a steering shaft of a vehicle steering system. The sensor 104 may provide an output representative of the torque applied to the steering wheel shaft to the controller 106. The controller 106 may control one or more vehicle systems 108, 110 in response to the sensor output. For example, system 108 may include an automatic braking system where braking is influenced by the torque applied to the steering wheel shaft. If an operator of the vehicle is performing an evasive maneuver, the sensor 104 may sense a torque applied to the steering wheel shaft that exceeds a threshold level. In response, the controller 106 may provide a control signal to the automatic braking system 108. The braking system 108 may then selectively manage the vehicle brakes to control the vehicle. The system 110 may include a traction control system wherein engine responsiveness and other parameters are influenced by the torque applied to the steering wheel shaft.

Figure 2:
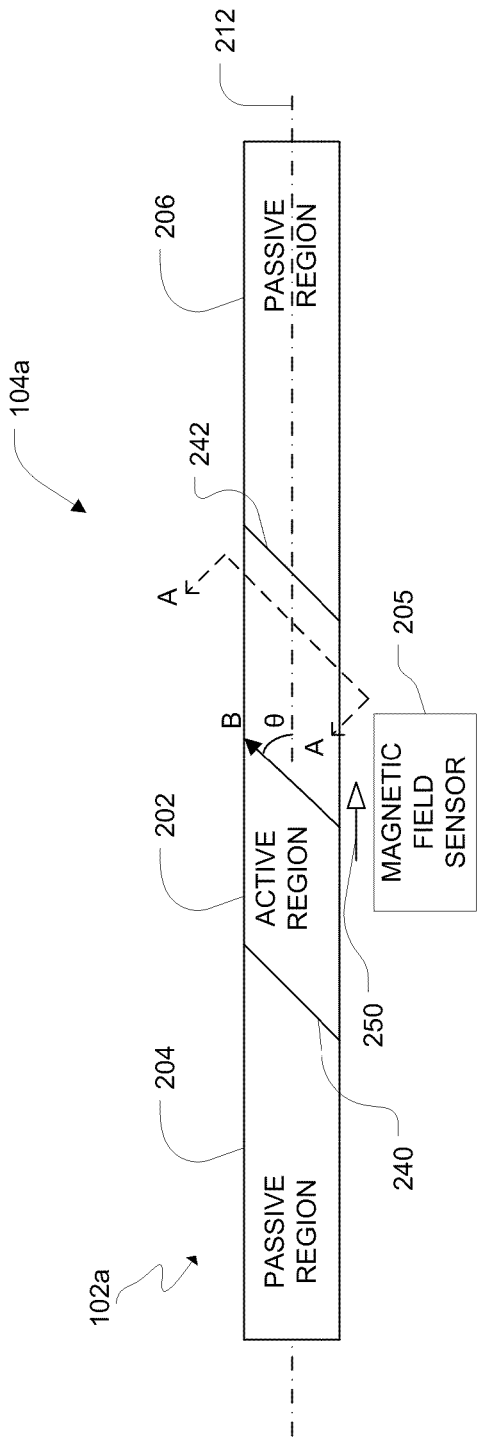
FIG. 2 diagrammatically illustrates an exemplary sensor consistent with the present disclosure.

FIG. 2 diagrammatically illustrates one exemplary embodiment of a sensor 104a consistent with the present disclosure. The illustrated exemplary sensor system includes a cylindrical shaft 102a including an elliptically magnetized active region 202 and a magnetic field sensor 205. The active region 202 may be established by magnetizing a portion of a homogenous shaft between two passive regions 204 and 206.

Figure 3:
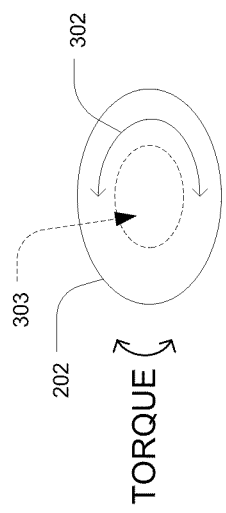
FIG. 3 is a cross-sectional view of the shaft of FIG. 2 taken along the line A-A of FIG. 2 illustrating elliptical magnetization of the shaft.

The shaft may be a solid shaft or may be tubular, i.e. having a central opening 303 therethrough as shown in dashed lines in FIG. 3. Embodiments described herein may be described as including a solid shaft. It is to be understood, however, that any embodiment of a sensor consistent with the present disclosure may include a solid shaft or a tubular shaft. The shaft 10 may be formed of a magnetorestrictive material capable of maintaining a magnetization induced therein following repeated application of torque and returning the magnetization to the direction established at polarization when the torque is reduced to zero. A variety of materials exhibiting these properties are well known to those of ordinary skill in the art. Some exemplary materials for forming the shaft are described in detail in U.S. Pat. No. 6,553,847, the teachings of which are incorporated herein by reference.

A variety of configurations for the magnetic field sensors 205 useful in connection with the present disclosure are also well known to those of ordinary skill in the art. In one embodiment, for example, the magnetic field sensors may be configured as fluxgate sensors. Hall Effect sensors may also or alternatively be used depending on the level of the sensed field.

With continued reference to FIG. 2, consistent with the present disclosure the active region 202 may be elliptically magnetized when the shaft is under zero torque. As used herein "elliptically magnetized" and "elliptical magnetization" refer to a magnetic polarization of a shaft established at an oblique angle to the centerline axis of the shaft in a non-circular elliptical path around the shaft. As shown, for example, the active region 202 may be polarized in a direction indicated by arrow B at an oblique angle 2 to a center line axis 212 of the shaft. In one embodiment an elliptical magnetization may be imparted with a direction of polarization at an angle 2 between about 10° and 80°. It should be understood, however, that although the angle 2 is illustrated in FIG. 2 as being less than 90 degrees, the angle 2 may also be greater than 90 degrees depending the desired orientation of the elliptical magnetization, and may be selected to establish a desired magnitude of the axial component 250 at zero torque. Also, the active region may extend over an axial extent of the shaft between a first end 240 and second end 242 that are substantially parallel with the direction of magnetization B. The axial extent of the active region may be selected depending upon the application, e.g. to accommodate manufacturing or operating tolerances in the axial position of the shaft.

The elliptically magnetized active region 202 establishes a magnetic field including a nonzero axial component 250 that may be sensed by the magnetic field sensor when the shaft 102 is at zero torque. This allows for diagnostic testing to ensure proper magnetization, installation and/or calibration of the shaft 102. As torque is applied to the shaft in any direction, the elliptical magnetization may be skewed from its original position at zero torque resulting in a change in the magnitude of axial component of the magnetic field. The change in the axial component of the magnetic field may be proportional to the applied torque. The magnetic field sensor 205 may sense the magnitude of the axial component and provide an output signal representative of the torque applied to the shaft 102.

Although sensing a nonzero axial component 250 of the magnetic field at zero torque, electronics associated with the magnetic sensor 205 may be calibrated to provide a desired sensed output at zero torque. In one embodiment, the sensed output at zero torque may be set to half the input voltage. The electronics may also be configured to reset the zero-torque output to a different level to allow for diagnostic testing, e.g. to ensure proper magnetization, installation, and/or calibration of the shaft 102.

FIG. 3 is a cross-sectional view of the shaft of FIG. 2 taken along the line A-A of FIG. 2 illustrating an elliptical magnetization of the shaft. The line A-A is taken along the direction of magnetization B at the angle 2 to the center line axis 212 of the shaft. As such, the cross sectional view of the active region of the shaft is elliptically shaped illustrating the elliptical direction of magnetization of the active region indicated by arrow 302.

Figure 4:
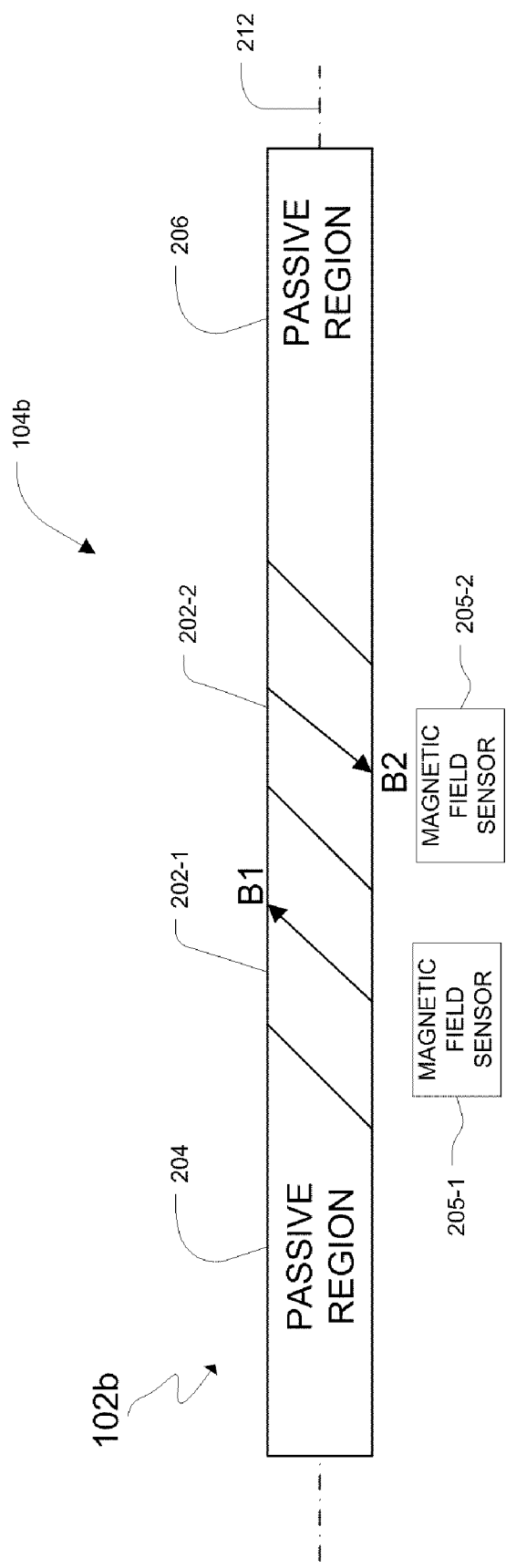
FIG. 4 diagrammatically illustrates another exemplary sensor consistent with the present disclosure.

A sensor system consistent with the present disclosure may include a shaft having a plurality of magnetized active regions. FIG. 4, for example, diagrammatically illustrates an exemplary embodiment of a sensor system 104b including a shaft 102b having first 202-1 and second 202-2 elliptically magnetized active regions and associated first 205-1 and second 205-2 magnetic field sensors. In the illustrated exemplary embodiment, the direction of polarization of the active region 202-1 indicated by arrow B1 is in the opposite direction compared to the direction of polarization of the active region 202-2 indicated by arrow B2. Providing the active regions with opposed magnetization directions may allow for differential sensing using sensors 205-1 and 205-2 to facilitate noise cancellation. Although the illustrated embodiment shows two active regions, any number of active regions may be provided. In addition, the active regions may be elliptically magnetized at the same oblique angle relative to the centerline axis 212 of the shaft, or at different angles.

Figure 5:
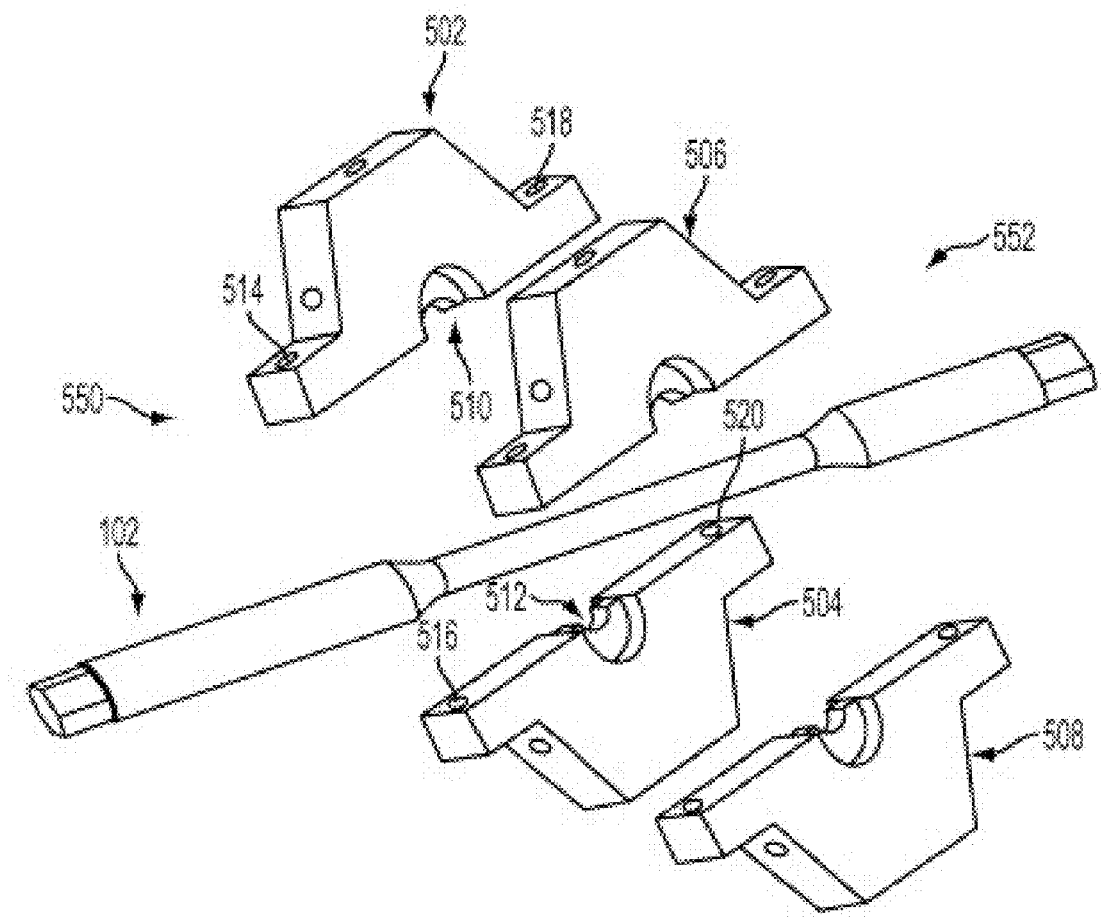
FIG. 5 is a perspective view of a shaft and pairs of electrode clamps to illustrate one method of inducing elliptical magnetization in a shaft consistent with the present disclosure.
Figure 6:
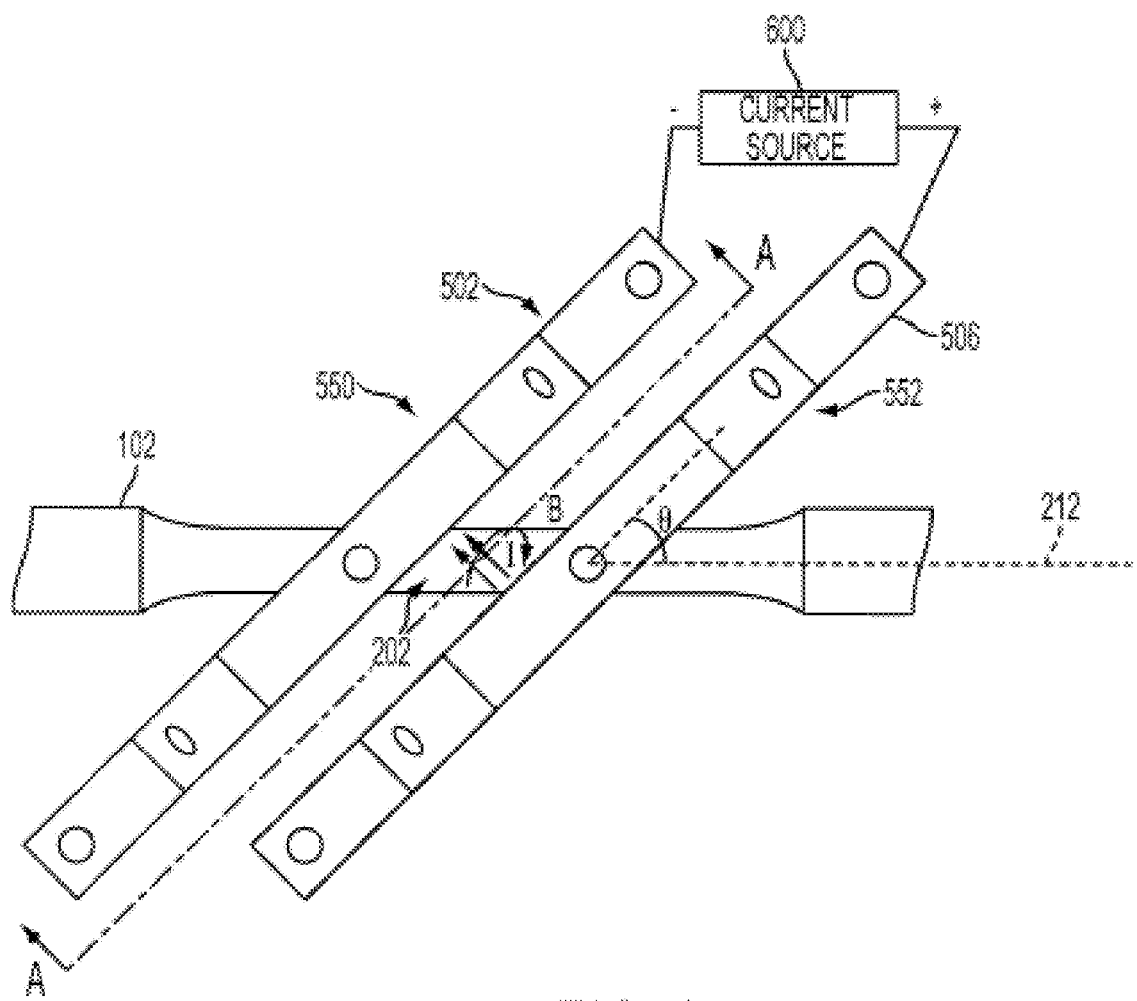
FIG. 6 is a top view of the shaft and electrode clamps of FIG. 5.
Figure 7:
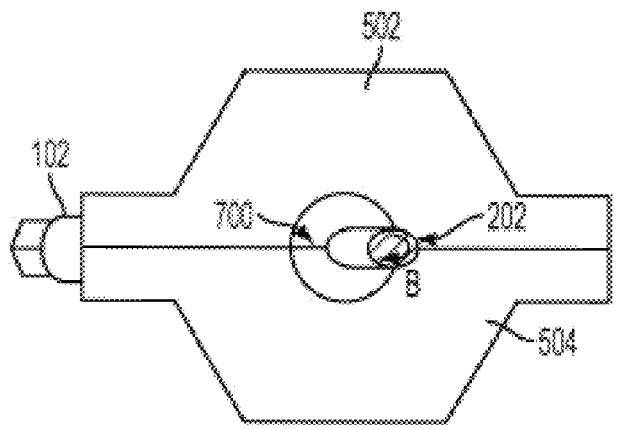
FIG. 7 is a cross-sectional view of the shaft and electrode clamps of FIG. 6 taken along the line A-A of FIG. 6.

Turning now to FIGS. 5-7, there is illustrated one exemplary system and method for inducing an elliptical magnetization in a shaft consistent with the present disclosure. In general, the illustrated exemplary embodiment establishes an elliptical magnetization by providing a current through an active region of a shaft at an oblique angle to the center line axis of the shaft. FIG. 5 illustrates a portion of the shaft 102 and first 550 and second 552 electrode clamp assemblies. The first electrode clamp assembly 550 includes an upper clamp 502 and a lower clamp 504. The upper clamp 502 may include portions defining a first portion 510 of a shaft opening, and the lower clamp 504 may include portions defining a second portion 512 of the shaft opening. When the upper 502 and lower 504 clamps are joined, e.g. using fasteners extending through openings 514, 516, 518 and 520, the first 510 and second 512 portions of the shaft opening defined by the upper and lower clamp portions may be positioned in opposed relationship to define a shaft opening 700 having an elliptically-shaped cross section, as illustrated in FIG. 7. The second electrode clamp assembly 552 may be constructed in a manner similar to the first electrode clamp assembly 550, including upper 506 and lower 508 clamps, which join to define shaft opening having an elliptically-shaped cross section.

As shown in FIG. 6, when the upper 502 and lower 504 clamps of the first clamp assembly 550 and the upper 506 and lower 508 clamps of the second clamp assembly 552 are joined about the shaft 102, the first 550 and second 552 clamp assemblies are disposed at an oblique angle to the centerline axis 212 of the shaft corresponding to the intended angle θ of the elliptical magnetization. A current source 600 may be coupled to the first and second electrode clamp assemblies for establishing current flow through the shaft indicated by arrows from the second clamp assembly to the first clamp assembly. The current flow I results in an elliptical magnetization of the active region 202 indicated by arrow B, and further illustrated in the cross-sectional view of FIG. 7 taken along the line A-A of FIG. 6. The elliptical magnetization exhibits a nonzero axial component at zero torque.

The magnitude of the field induced in the shaft may depend on the requirements of the intended application. In one embodiment, a current of 400 A may be used to elliptically magnetize a shaft for achieving field strength at the shaft surface of about 3000 Gauss. The shaft magnetization may decrease from the shaft surface to the center of the shaft. In another embodiment, the current source may provide a current of 1,000 A for elliptically magnetizing the shaft.

Figure 8:
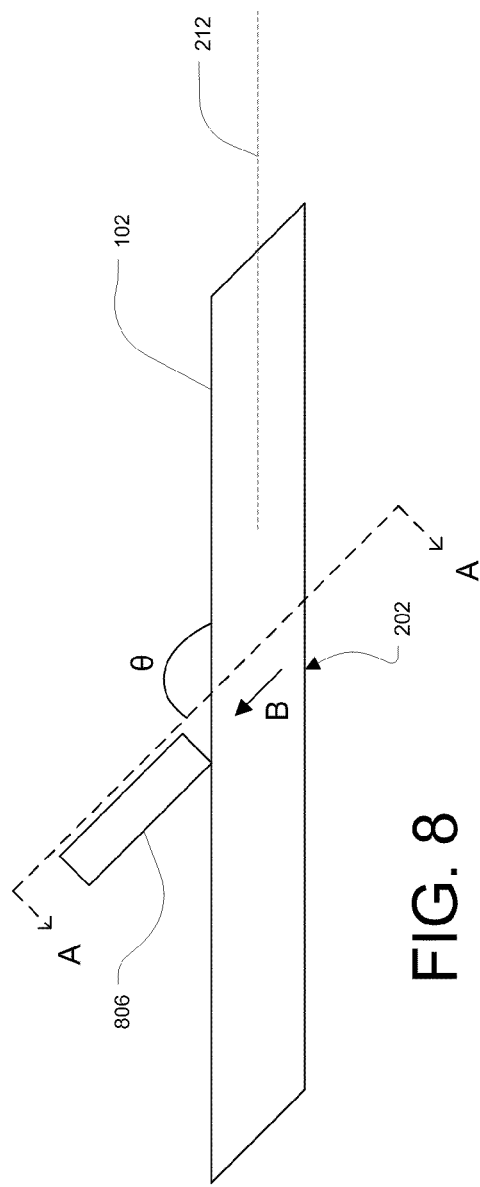
FIG. 8 is a view of a shaft and electromagnet tilted relative to the shaft to illustrate another method of inducing elliptical magnetization in a shaft consistent with the present disclosure.
Figure 9:
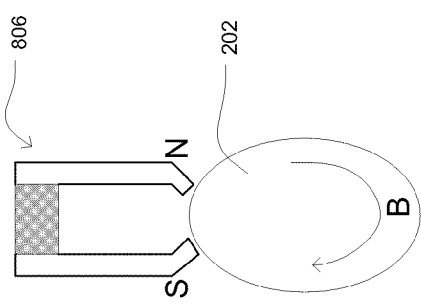
FIG. 9 is a cross-sectional view of the shaft and electromagnet of FIG. 8 taken along the line A-A of FIG. 8.

FIGS. 8-9 illustrate another exemplary system and method for inducing an elliptical magnetization in a shaft consistent with the present disclosure. In the illustrated exemplary embodiment, the shaft 102 is magnetized to include an active region 202 using an electromagnet 806 oriented at oblique angle θ to the center line 212 of the shaft. FIG. 9 is a cross-sectional view of the shaft and electromagnet 806 of FIG. 8 taken along the line A-A of FIG. 8 further illustrating the elliptical magnetization of the active region 202 induced by the electromagnet 806.

Figure 10:
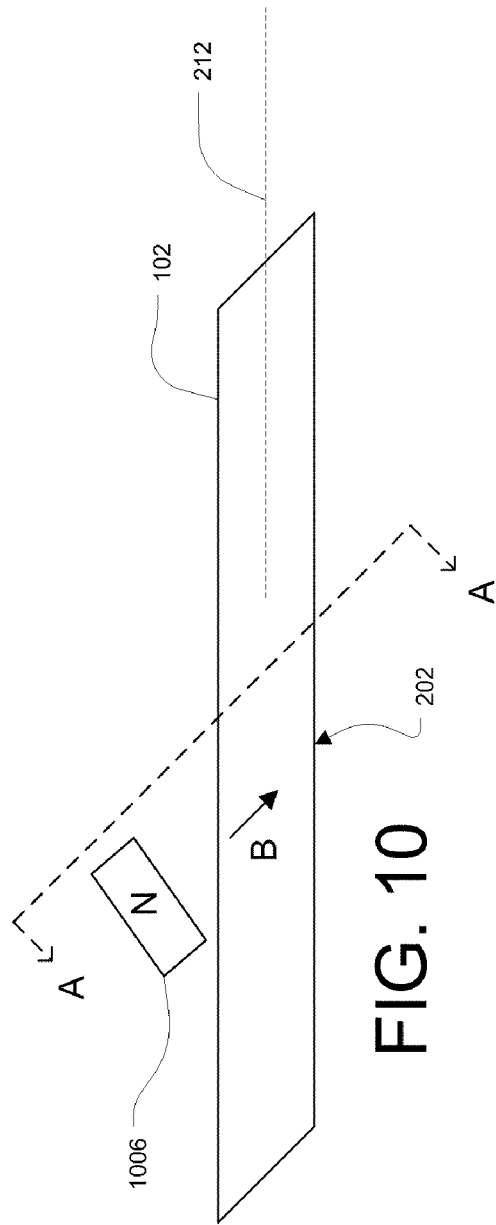
FIG. 10 is a view of a shaft and permanent magnet tilted relative to the shaft to illustrates another method of inducing elliptical magnetization in a shaft consistent with the present disclosure.
Figure 11:
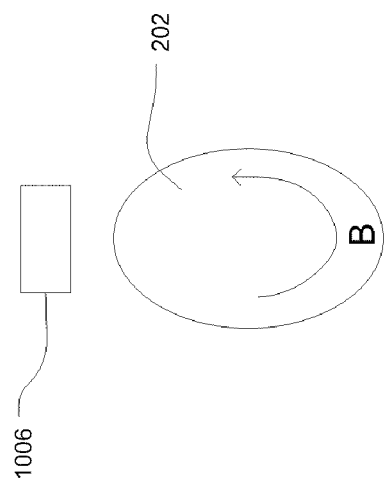
FIG. 11 is a cross-sectional view of the shaft and permanent magnet of FIG. 10 taken along the line A-A of FIG. 10.

FIGS. 10-11 illustrate another exemplary system and method for inducing an elliptical magnetization in a shaft consistent with the present disclosure. In the illustrated exemplary embodiment, the shaft 102 is magnetized to include an active region 202 using a permanent magnet 1006 oriented at an oblique angle 2 to the center line 212 of the shaft. FIG. 11 is a cross-sectional view of the shaft and permanent magnet of FIG. 10 taken along the line A-A of FIG. 10 further illustrating the elliptical magnetization of the active region 202 induced by the permanent magnet 1006.

Figure 12:
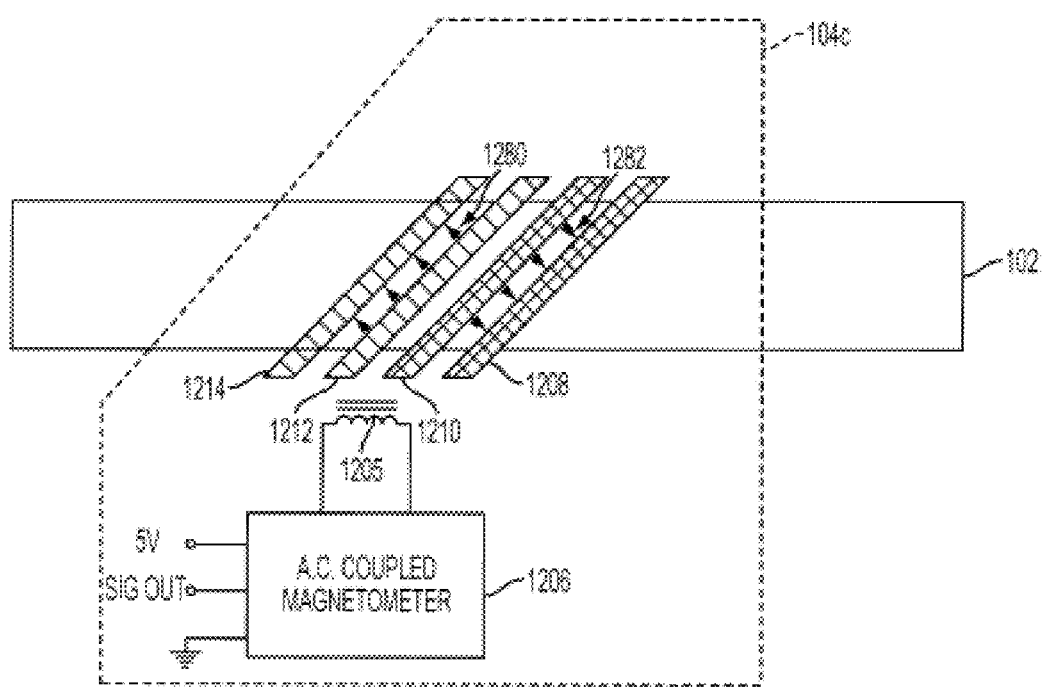
FIG. 12 diagrammatically illustrates another embodiment of a sensor having two elliptically magnetized regions with AC analysis of a time varying magnetic field as the shaft rotates.

FIG. 12 illustrates another embodiment 104c of a sensor consistent with the present disclosure. The illustrated exemplary embodiment includes first 1280 and second 1282 active regions with elliptical magnetization. The first active region 1280 may be established by providing a current from the electrode clamp 1212 to the electrode clamp 1214, as illustrated by the arrows between clamps 1212 and 1214. Similarly, the second active region 1282 may be established by providing a current from the electrode clamp 1210 to the electrode clamp 1208, as illustrated by the arrows between clamps 1210 and 1208. The sensor 104c may include a fluxgate coil 1205 and an A.C. coupled magnetometer 1206.

In operation, the fluxgate coil 1205 may sense alternating magnetic polarities as the shaft rotates due to the elliptical magnetizations of the active regions of the shaft. For a constant applied torque, the output of the magnetometer 1206 may be an alternating signal having amplitude proportional to the applied torque. The frequency of the alternating signal may be proportional to the shaft speed to provide shaft speed measurements in addition to torque measurements. By A.C. coupling the magnetometer 1206, any undesired D.C. or slowly varying magnetic fields, such as common mode field signals, may be rejected.

Accordingly, the sensor 104c having elliptical magnetization produces a time varying magnetic field sensed by the fluxgate coil 1205. Only one fluxgate coil 1205 may be necessary. The A.C. processing of the sensor 104c may reject undesired slowly varying common mode magnetic fields. The complexity of the signal processing may therefore be significantly reduced compared to conventional D.C. processing. In addition, A.C. processing may eliminate D.C. offsets and system noise associated with D.C. processing (1/f noise). D.C. drift in the output may also be avoided, and signal-to-noise (S/N) levels of the output signal may be improved compared to conventional D.C. processing.

Figure 13:
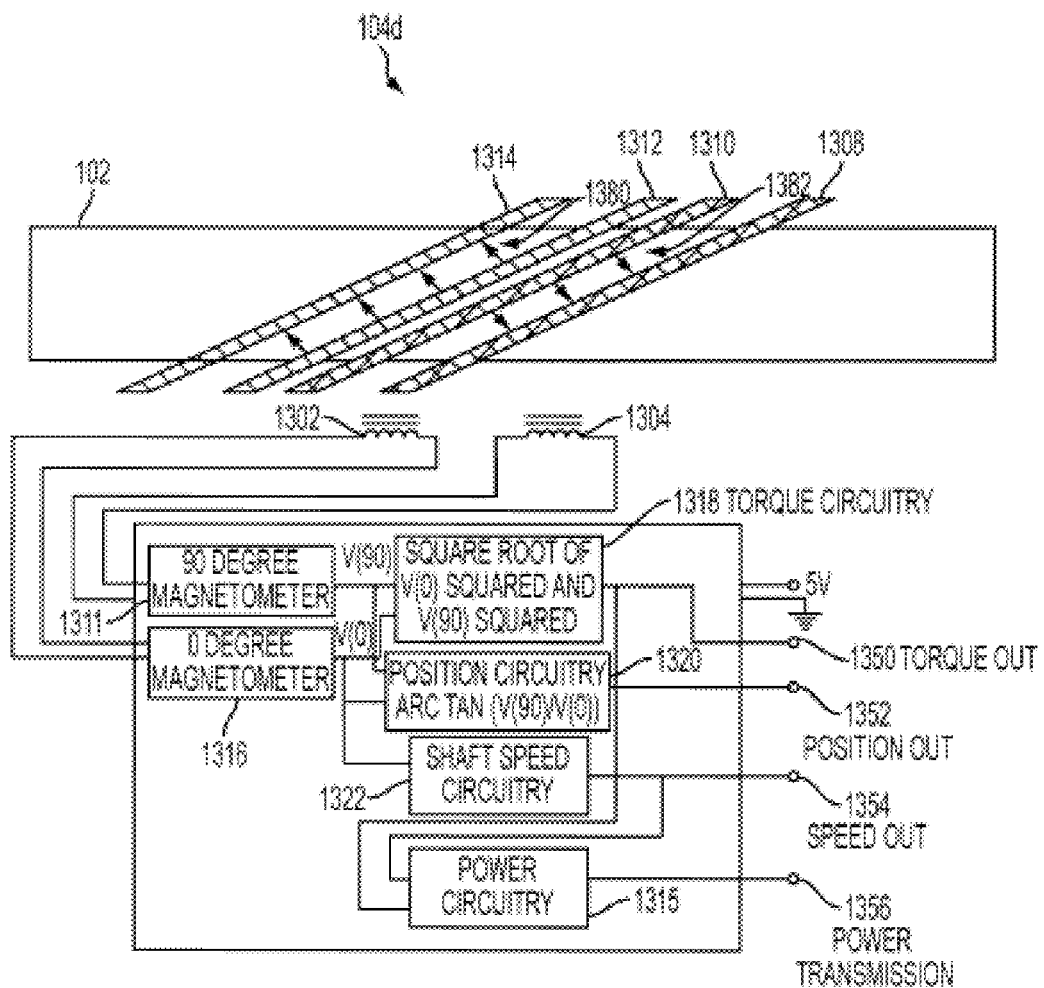
FIG. 13 diagrammatically illustrates another embodiment of a sensor having two elliptically magnetized regions with AC analysis of a time varying magnetic field as the shaft rotates to concurrently monitor shaft parameters in addition to torque.

FIG. 13 illustrates an embodiment 104d of the sensor including first 1380 and second 1382 active regions with elliptical magnetization, and first 1302 and second 1304 fluxgate coils. The first 1302 and second 1304 fluxgate coils may be coupled to associated magnetometers 1316, 1311, respectively. The elliptical magnetization may produce a time-varying magnetic field sensed by the fluxgate coils as the shaft rotates. In addition to monitoring torque, the sensor 104d of FIG. 13 may monitor parameters such shaft position, shaft speed, and the power transmitted by the shaft.

The flux gate coils 1302 and 1304 may be positioned about the shaft so that the signals to the associated magnetometers 1316 and 1311 are time-varying and 90 degrees out of phase with each other. Additional circuitry 1318, 1320, 1322, and 1315 may utilize one or both of the outputs of the magnetometers 1316 and 1311, either directly or indirectly, to monitor torque, shaft position, shaft speed, and power transmitted.

Figure 14:
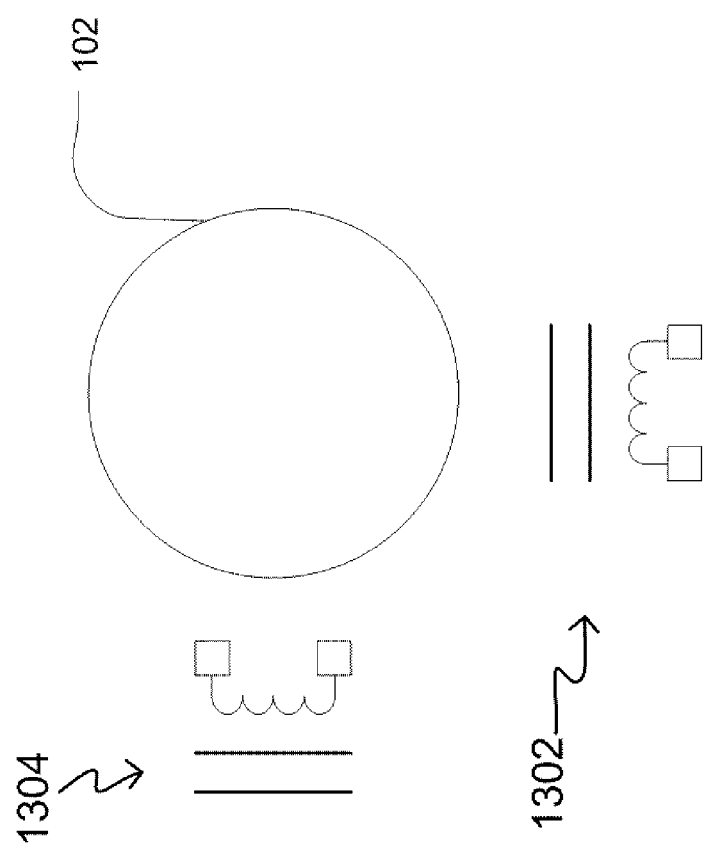
FIG. 14 is a transverse cross-section of the active region of the shaft of FIG. 13 illustrating an example of radial displacement of the two fluxgate coils of FIG. 13.

In the exemplary embodiment illustrated in FIG. 13, the flux gate coils 1302 and 1304 are axially spaced about relative to the active regions 1380, 1382 to produce time-varying signals 90 degrees out of phase with each other. The flux gate coils 1302 and 1304 may also, or alternatively, be circumferentially displaced relative to the shaft. FIG. 14, for example, illustrates the coils 1302 and 1304 spaced at 90 degrees from each other around the circumference of the shaft to provide time-varying signals 90 degrees out of phase with each other.

In operation, the output signal of the 0 degree magnetometer 1316 may be a time varying voltage signal that is 90 degrees out of phase with the time varying voltage signal output from the 90 degree magnetometer 1311. Torque circuitry 1318 may accept the output signals from the magnetometers 1316 and 1311 and provide an output signal at terminal 1350 representative of torque applied to the shaft. The torque circuitry 1318 may calculate the magnitude of the square root of the sum of the square of the two magnetometer output signals to provide the output signal representative of the applied torque.

The position circuitry 1320 may accept the output signals from both magnetometers 1316 and 1311 and provide an output signal representative of a position of the shaft at terminal 1352. The position circuitry 1320 may calculate the arc tangent of the ratio of the output signal of the 90 degree magnetometer 1311 to the 0 degree magnetometer 1316 to provide the output signal representative of the position of the shaft.

The shaft speed circuitry 1322 may accept one output signal from either the 90 degree magnetometer 1311 or the 0 degree magnetometer 1316 and provide an output signal representative of the speed of the shaft at terminal 1354. The shaft speed circuitry 1322 may analyze the frequency of the input time varying signal to ascertain the speed of the shaft. Finally, the product circuitry 1315 may multiply the output signal of the torque circuitry 1318 with the output of the shaft speed circuitry 1322 to determine the power transmitted through the shaft. An output signal representative of the power transmitted through the shaft may then be provided at terminal 1356. Those skilled in the art will recognize various circuitry configurations to provide the functionality of circuitry 1318, 1320, 1322, and 1315.

A sensor system consistent with the present disclosure may include a shaft including one or more active regions provided in other or additional configurations. A single magnetized active region in a shaft consistent with the present disclosure may include at least partially opposing magnetic polarizations to impart alternating magnetic field polarities to a sensor positioned adjacent the active region as the shaft rotates. Opposing magnetic polarizations in a single magnetized active region may be established by providing currents in an axial extent of the shaft that are in at least partially opposing directions in a radial cross-section taken in the axial extent, thereby establishing magnetic polarizations that are in at least partially opposing directions in the radial cross section taken in the axial extent. The magnetic field polarities imparted to a sensor in such a configuration may cause the sensor to provide a sinusoidal output that may be used to sense torque on the shaft, the rotational and/or axial position of the shaft and/or the shaft rotational speed.

Figure 15:
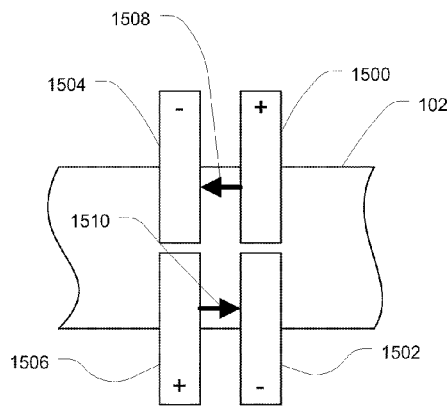
FIG. 15 is a side view of a shaft and electrode clamps illustrating another system and method of magnetizing a shaft consistent with the present disclosure.

Turning to FIG. 15, for example, an active region may be formed in a shaft 102 using first and second sets of electrode clamp assemblies configured for establishing a first current indicated by arrow 1508 generally parallel to the shaft axis in a first radial portion of the active region and a second current indicated by arrow 1510 in a direction opposite to the first current in a second radial portion of the active region. In the illustrated exemplary embodiment, the first electrode clamp assembly includes a first clamp 1500 disposed on the shaft and a second clamp 1502 positioned in a spaced and opposed relationship on an opposite side of the shaft from the first clamp. The second electrode clamp assembly includes a first clamp 1504 disposed on the shaft and a second clamp 1506 positioned in a spaced and opposed relationship on an opposite side of the shaft from the first clamp. The first and second electrode clamp assemblies are spaced from each other along the length of the shaft to establish the axial length of the active region.

To avoid shorting of adjacent clamps, current may be established in the illustrated directions using two separate current sources with isolated grounds. In various exemplary embodiments described current sources are not shown for simplicity. Instead, positive and negative terminal connections of current sources may be indicated using "+" and "−" signs on associated electrode clamps. As shown in FIG. 15, the positive terminals of separate current sources may be connected to clamps 1500 and 1506, respectively, and the negative terminals of the current sources may be connected to clamps 1502 and 1504 respectively. In a configuration where the distance between the clamps is sufficiently large, a single current source may be used to establish the illustrated current flow.

Figure 15A:
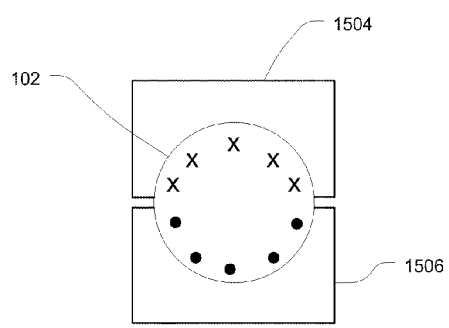
FIG. 15A is a radial sectional view of the embodiment of FIG. 15 taken between electrode clamp assemblies.

FIG. 15A is a radial cross-sectional view of the configuration of FIG. 15 taken between the first and second clamp assemblies and illustrating the direction of current flow in the radial cross-section of the active region. Current into the sheet is indicated by an "x" and current out of the sheet is indicated by a "•". As shown, the configuration establishes currents in opposing directions in the same axial extent of the shaft.

The opposing currents in the shaft may establish opposing magnetic fields in the same active region. When torque is applied one portion of the active region may establish a positive axial field component while the other portion of the active region may produce a negative axial field component. As the shaft is rotated the alternating positive and negative field components may be sensed by one or more magnetic field sensors positioned adjacent the shaft. The sensor may provide a sinusoidal output indicative of torque on the shaft, shaft rotational speed and/or shaft position.

Those of ordinary skill in the art will recognize that the term "sinusoidal" as used herein is not intended to refer to a perfect sinusoid, but refers to a generally sinusoidal signal, i.e. varying in the general shape of sinusoid depending on the rotational angle of the shaft relative to the coil. Also, those of ordinary skill in the art will recognize that the shape of the output depends upon the configuration of the magnetization applied to the active region(s) of the shaft. Thus, although embodiments may be described herein as providing sinusoidal output, it is to be understood that any sensor consistent with the present disclosure may be configured to provide an output that varies with the rotational angle of the shaft (and torque and/or speed), but that is not necessarily sinusoidal.

Figure 16:
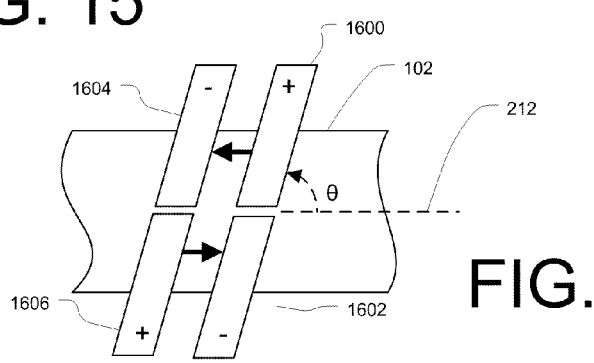
FIG. 16 is a side view of a shaft and electrode clamps illustrating another system and method of magnetizing a shaft consistent with the present disclosure.

FIG. 16 illustrates another electrode clamp configuration for forming an active region in a shaft consistent with the present disclosure. As shown, an active region may be formed in a shaft 102 using first and second sets of electrode clamp assemblies coupled to the shaft an oblique angle θ to the shaft axis 212 to provide at least partially elliptical contact surfaces. In the illustrated exemplary embodiment, the first electrode clamp assembly includes a first clamp 1600 angularly disposed on the shaft and a second clamp 1602 positioned in a spaced opposed relationship on an opposite side of the shaft from the first clamp to thereby provide a partially elliptical contact surfaces between the first and second clamps and the shaft. The second electrode clamp assembly includes a first clamp 1604 angularly disposed on the shaft and a second clamp 1606 positioned in a spaced opposed relationship on an opposite side of the shaft from the first clamp to thereby provide a partially elliptical contact surfaces between the first and second clamps and the shaft. The first and second electrode clamp assemblies are spaced from each other along the length of the shaft to establish the axial length of the active region.

Current for magnetizing the active region may be established in the directions indicated by the arrows extending the between the clamps, by connecting clamps 1600 and 1606 to a positive terminal of a current source and connecting clamps 1602 and 1604 to a negative terminal of the current source. Again, as the shaft rotates alternating plus and minus fields produce a sinusoidal field that may be sensed by a magnetic field sensor positioned adjacent the shaft. The sensor may provide a sinusoidal output indicative of torque on the shaft, shaft rotational speed and/or shaft position. In the illustrated embodiment, the sensor offset value, i.e. the sensor output at zero torque, and the phase and amplitude of the sensor sinusoidal output may be adjusted by adjusting the angle θ.

Figure 17:
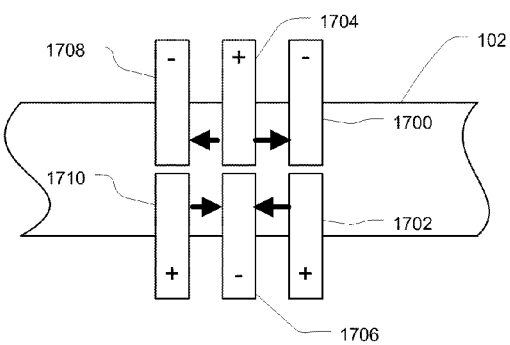
FIG. 17 is a side view of a shaft and electrode clamps illustrating another system and method of magnetizing a shaft consistent with the present disclosure.

FIG. 17 illustrates another electrode clamp configuration for forming first and second active regions in a shaft consistent with the present disclosure. In the illustrated exemplary embodiment, first, second and third sets of electrode clamp assemblies may be coupled to the shaft in spaced, opposed relationship, as illustrated and described in connection with FIG. 15. In the embodiment of FIG. 17, however, first and second active regions having opposing magnetizations may be established to facilitate double differential measurements. In particular, clamps 1702, 1704 and 1706 may be coupled to the positive terminal(s) of a single current source or separate current sources, and clamps 1700, 1706 and 1708 may be coupled to the associated negative terminals to establish the currents indicated by arrows shown between the clamps.

Although a single differential sensing configuration may be useful in connection with a system consistent with the present disclosure, in some applications a differential measurement may interpret an interfering signal as a valid signal.

A permanent magnet, for example, produces gradients that a differential measurement may pick up as valid signal. A magnetic field associated with a permanent magnet may decay in a non-linear fashion as distance is increased from the magnet. If a permanent magnet, e.g. as part of a mechanic's tool, is placed near a sensor with single differential measurement, error in the sensor output signal may be produced. A double differential measurement may be used to avoid such an error.

Figure 18:
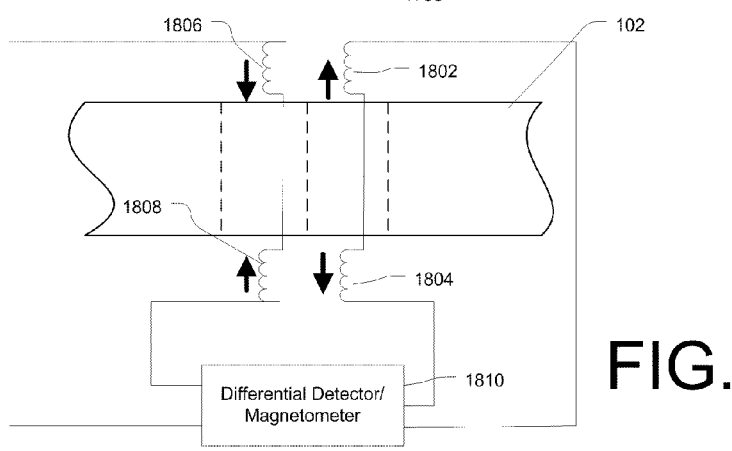
FIG. 18 is a side view of a shaft magnetized using a configuration as shown in FIG. 17 and including a double differential detector configuration.

FIG. 18 illustrates a shaft including first and second regions formed, for example, using the configuration of FIG. 17 and an associated double differential detector/magnetometer configuration. A shown, separate flux gate sensors 1802, 1804, 1806 and 1808 may be positioned adjacent the respective active regions for sensing magnetic fields in the directions indicated by the arrows adjacent the sensors. The sensor outputs may be provided to a double differential detector 1810, which may determine the difference between the differences between the sensor outputs associated with each clamp assembly, i.e. the differential of a differential. This double differential approach may be effective in canceling first order magnetic field gradients, and result in a four fold increase in signal strength as opposed to a two fold increase in the case of a traditional differential measurement.

Figure 19:
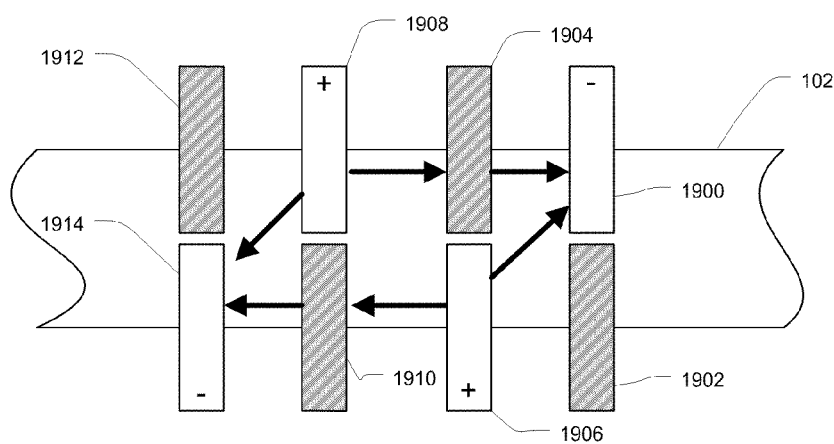
FIG. 19 is a side view of a shaft and electrode clamps illustrating another system and method of magnetizing a shaft consistent with the present disclosure.

FIG. 19 illustrates another electrode clamp configuration for forming first and second and third active regions in a shaft consistent with the present disclosure. In the illustrated exemplary embodiment, first, second, third, and fourth sets of clamp assemblies may be coupled to the shaft in spaced, opposed relationship, as illustrated and described in connection with FIG. 15. In the embodiment of FIG. 19, however, clamps 1900, 1906, 1908 and 1914 may be conductive electrode clamps and clamps 1902, 1904, 1910 and 1912 may be non-conductive clamp. Clamps 1906 and 1908 may be coupled to the positive terminal(s) of a single current source or separate current sources, and clamps 1900 and 1914 may be coupled to the associate negative terminals to establish the currents indicated by arrows shown between the clamps. As the shaft rotates, the magnetizations established by the illustrated current flow may be sensed by one or more sensors, e.g. positioned axially in the center of the middle active region, which may provide a sinusoidal output indicative of torque, speed and/or position.

Figure 20:
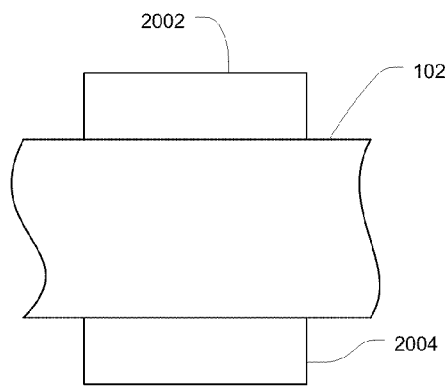
FIG. 20 is a side view of a shaft and electrode clamps illustrating another system and method of magnetizing a shaft consistent with the present disclosure.

FIG. 20 illustrates another exemplary embodiment of an electrode clamp configuration for forming a magnetized active region in a shaft consistent with the present disclosure. In illustrated embodiment first 2002 and second 2004 electrode clamps are positioned generally parallel to the axis of the shaft 102. The first electrode is disposed on a top surface of the shaft and a second electrode is disposed on a bottom surface of the shaft approximately 180 degrees from the first electrode.

Figure 20A:
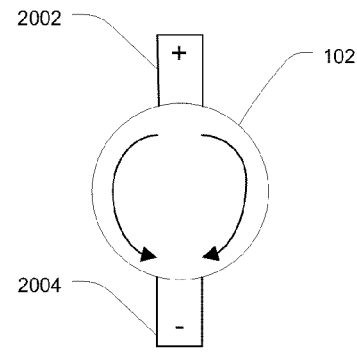
FIG. 20A is a radial sectional view of the embodiment of FIG. 20 taken through the electrode clamp assemblies.

Current for magnetizing the active region of the shaft may be established by connecting the first clamp 2002 to a positive terminal of a current source and the second clamp 2004 to a negative terminal of the current source. FIG. 20A is a radial cross-sectional view of the configuration of FIG. 20 taken through the first and second electrode clamps with the arrows illustrating the resulting direction of current flow in the radial cross-section of the active region. As shown, the configuration establishes currents, and hence magnetic polarities, in opposing directions in the same axial extent of the shaft. As the shaft rotates the alternating positive and negative field components may be sensed by one or more magnetic field sensors positioned adjacent the shaft. The sensor may provide a sinusoidal output indicative of torque on the shaft, shaft rotational speed and/or shaft position.

Figure 21:
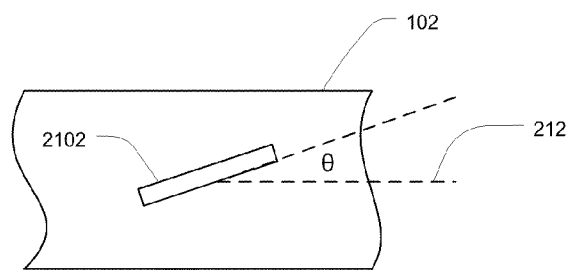
FIG. 21 is a top view of a shaft and electrode clamps illustrating another system and method of magnetizing a shaft consistent with the present disclosure.
Figure 21A:
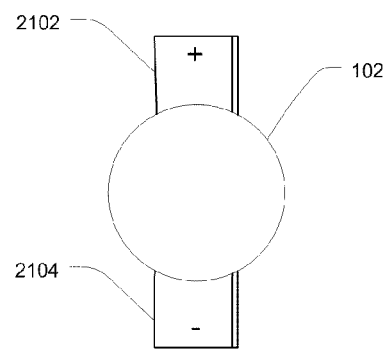
FIG. 21A is a radial sectional view of the embodiment of FIG. 21 taken through the electrode clamp assemblies.

FIG. 21 illustrates another exemplary embodiment of an electrode clamp configuration for forming a magnetized active region in a shaft consistent with the present disclosure. The embodiment of FIG. 21 includes first and second electrode clamps similar to the configuration of FIG. 20, except the electrodes are disposed at an angle θ to the shaft axis. Current for magnetizing the active region of the shaft may be established by connecting the first clamp 2102 to a positive terminal of a current source and the second clamp 2104 to a negative terminal of the current source. This configuration results in current, and hence magnetic polarities, flowing and twisting on the surface of the shaft in at least partially opposing directions in the same axial extent of the shaft. Again, as the shaft rotates alternating magnetic field polarities produce a sinusoidal field that may be sensed by a magnetic field sensor positioned adjacent the shaft. The sensor may provide a sinusoidal output indicative of torque on the shaft, shaft rotational speed and/or shaft position. In the illustrated embodiment, the sensor offset value, i.e. the sensor output at zero torque, and the phase and amplitude of the sensor sinusoidal output may be adjusted by adjusting the angle θ.

FIG. 22 illustrates another exemplary embodiment of an electrode clamp configuration for forming a magnetized active region in a shaft consistent with the present disclosure. The embodiment of FIG. 22 is similar to the embodiment of FIG. 20, except first 2202, second 2204, third 2206 and fourth 2208 electrode clamps are provided generally parallel to the surface of the shaft and approximately 90 degrees from each other. Current for magnetizing the active region of the shaft may be established by connecting the clamps 2204 and 2208 to a positive terminal(s) of one or more current sources and the clamps 2202 and 2206 to the negative terminal(s) of the current sources.

FIG. 22A is a radial cross-sectional view of the configuration of FIG. 22 taken through the electrode clamps with the arrows illustrating the resulting direction of current flow in the radial cross-section of the active region. As shown, the configuration establishes currents, and hence magnetic polarities, in opposing directions in the same axial extent of the shaft. As the shaft rotates through one revolution four changes in the magnetic field polarity may be sensed by one or more magnetic field sensors positioned adjacent the shaft. The sensor may provide a sinusoidal output indicative of torque on the shaft, shaft rotational speed and/or shaft position. Due to the changes in magnetic polarity, the sinusoidal output may have a higher frequency than the embodiment of, for example, FIG. 20.

FIG. 23 illustrates another exemplary embodiment of an electrode clamp configuration for forming a magnetized active region in a shaft consistent with the present disclosure. The embodiment of FIG. 23 is similar to the embodiment of FIG. 20, except a first active region is established by first 2302 and second 2304 electrode clamps and a second active region is established by third 2306 and fourth 2308 electrode clamps. Current for magnetizing the active regions of the shaft 102 may be established by connecting clamps 2302 and 2308 to a positive terminal(s) of one or more current sources and clamps 2304 and 2306 to the negative terminal(s) of the current sources. FIG. 23A is a radial cross-sectional view of the configuration of FIG. 23 taken through clamps 2306 and 2308 and FIG. 23B is a radial-cross sectional view of the configuration of FIG. 23 taken through clamps 2302 and 2304.

The arrows in FIGS. 23A and 23B illustrate the direction of current flow in the radial cross-sections of the active regions. As shown, the configuration establishes currents, and hence magnetic polarities, in opposing directions in the first active region of the shaft, and opposing currents in the second active region that are in directions opposite to that of the first active region. This configuration facilitates a double differential measurement of the change in magnetic flux resulting from torque on the shaft.

FIGS. 24 and 24A illustrate another exemplary embodiment of an electrode clamp configuration for forming a magnetized active region in a shaft consistent with the present disclosure. The embodiment of FIG. 24 includes a first electrode clamp assembly including a first 2400 and second 2402 clamps and a second electrode clamp assembly including first 2406 and second 2408 clamps. Current for magnetizing the active regions of the shaft may be established in the direction of the arrows in FIG. 24 by connecting the electrode clamps to one or more current sources as shown. In the illustrated embodiment, current may flow 90 degrees on the surface of shaft taking a spiral path.

Figures 25, 25A:
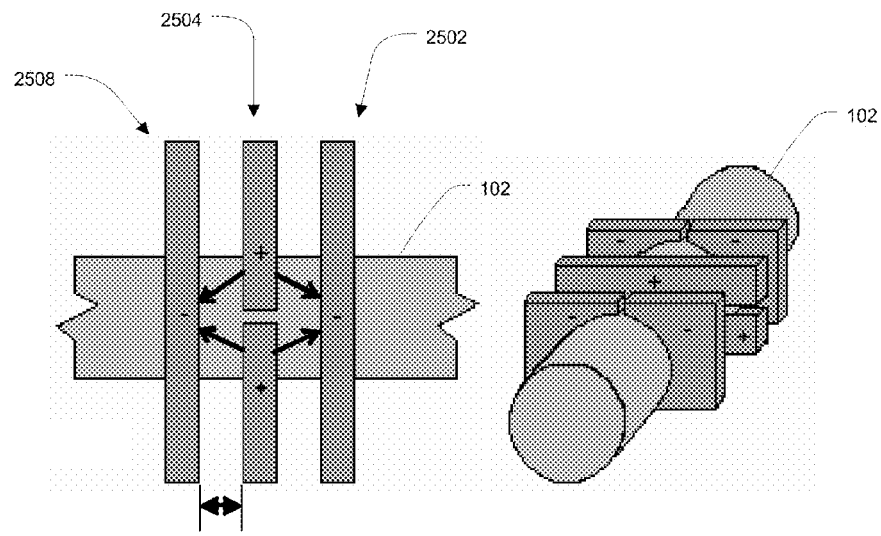
FIG. 25 is a top view of a shaft and electrode clamps illustrating another system and method of magnetizing a shaft consistent with the present disclosure.
FIG. 25A is a perspective view of the embodiment of FIG. 25.

FIGS. 25 and 25A illustrate another exemplary embodiment of an electrode clamp configuration consistent with the present disclosure. The embodiment of FIG. 25 is similar to the embodiment of FIG. 24, except first and second active regions are established using first 2502, second 2504 and third 2508 electrode clamp assemblies. Current for magnetizing the active regions of the shaft may be established in the direction of the arrows in FIG. 25 by connecting the electrode clamps to one or more current sources as shown. This configuration allows for a double differential measurement, as described above.

Figures 26, 26A:
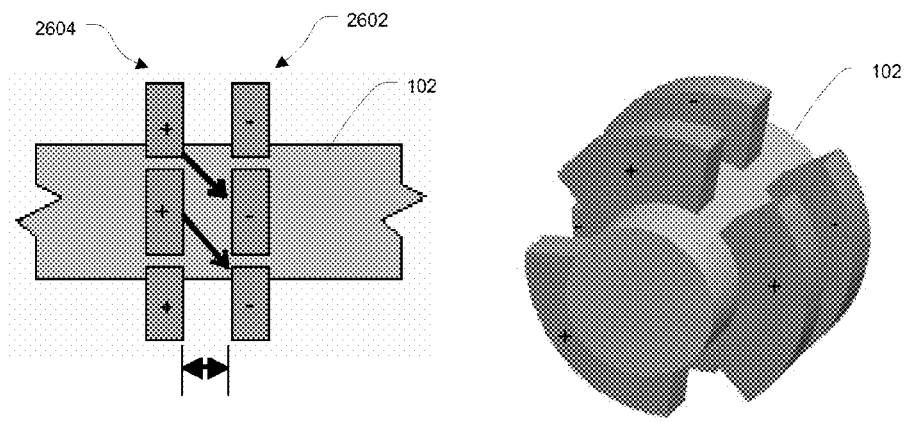
FIG. 26 is a top view of a shaft and electrode clamps illustrating another system and method of magnetizing a shaft consistent with the present disclosure.
FIG. 26A is a perspective view of the embodiment of FIG. 26.

FIGS. 26 and 26A illustrates another exemplary embodiment of an electrode clamp configuration for forming a magnetized active region in a shaft consistent with the present disclosure. The embodiment of FIG. 26 includes two sets of three electrodes disposed at 60 degree intervals around the shaft. As shown the first set 2602 of three electrodes may be connected to a positive terminal of a current source and the second set 2604 of three electrodes may be connected to a second set of three electrodes to establish current in the direction of the arrows in FIG. 26. In this configuration, current may flow 60 degrees on the surface of shaft from one electrode to another, thereby establishing more magnetic poles and a higher frequency sinusoidal output.

Figure 27:
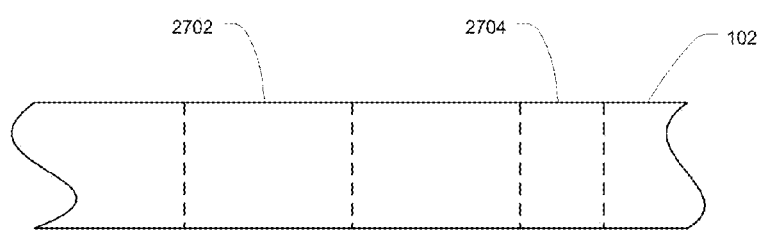
FIG. 27 is a side view of a shaft consistent with the present disclosure including first and second active regions.

FIG. 27 illustrates a shaft consistent with the present disclosure including first 2702 and second 2704 active regions where one region may be used to measure torque while the other region measures position. The torque region 2702 may be magnetized according to any of the schemes described herein. The position sensing region 2704 may be magnetized in a coil or permanent magnet to simply create two poles. As the shaft 102 rotates a sinusoidal signal is generated that does not vary with torque and can be used to measure the shaft rotational position.

Figure 27A:
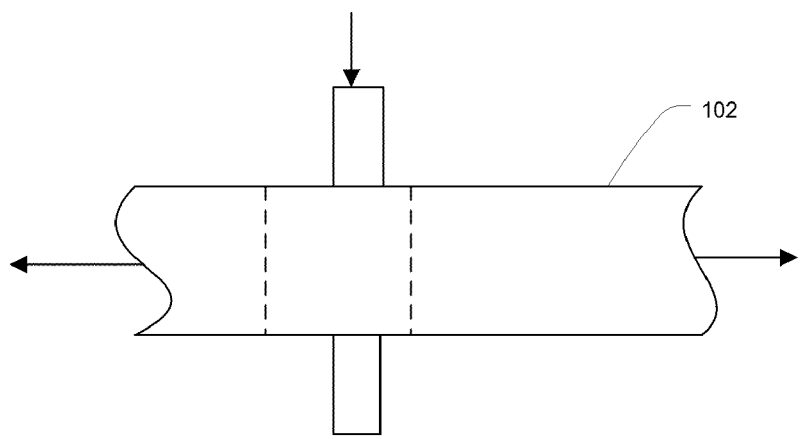
FIG. 27A is a side view of a shaft consistent with the present disclosure illustrating establishment of saturation zones by taping an axial current through a center of the shaft.

Consistent with the present disclosure, configurations for establishing one or more magnetized active regions may also be establish saturation zones on opposing sides of the active region(s). As is know, a saturation zone may be provided for establishing strong magnetic boundaries for the active region, resulting in an active region that is more stable and affected less by nearby ferrous objects. In one embodiment, a current may be passed axially through the shaft prior to establishing the magnetized active region, e.g. using electrode clamp assemblies, as described above. The axial current through the shaft may establish strong saturation zones on either side of the subsequently established active region. FIG. 27A illustrates another embodiment wherein an initial saturation current is tapped through the middle of the shaft, i.e. to establish a saturation current in the direction of the illustrated arrows.

This configuration may be used to establish saturation zones of opposite polarities on opposite sides of a subsequently formed active region.

Figure 28:
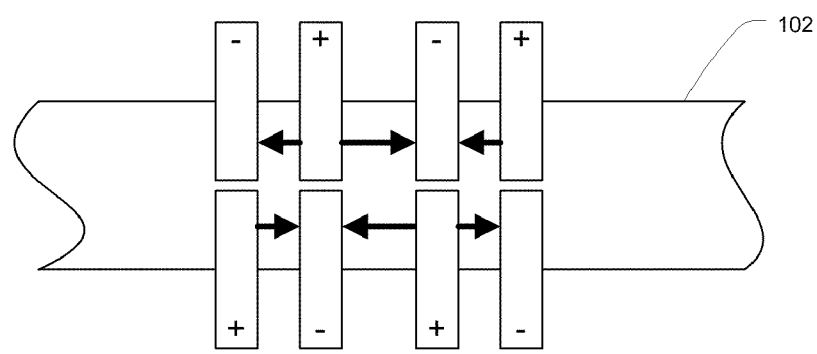
FIG. 28 is a side view of a shaft and electrode clamps illustrating another system and method of magnetizing a shaft consistent with the present disclosure.
Figure 29:
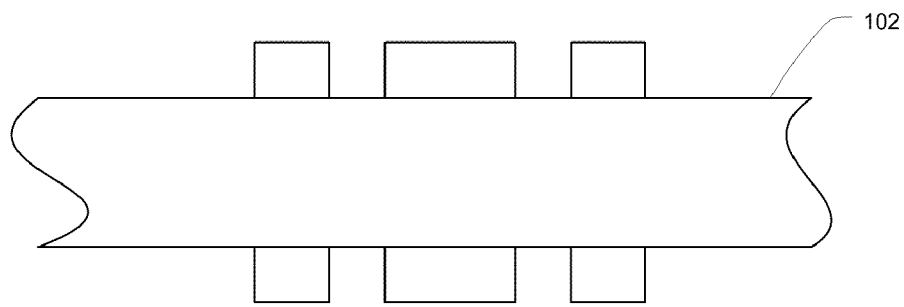
FIG. 29 is a side view of a shaft and electrode clamps illustrating another system and method of magnetizing a shaft consistent with the present disclosure.

Saturation zones may also be formed using electrode clamp configurations. FIG. 28, for example, illustrates an exemplary configuration using electrode clamp assemblies for establishing saturation zones on opposite sides of an active region for configuration similar to the embodiment of FIG. 15. FIG. 29 illustrates an exemplary configuration using electrode clamp assemblies for establishing saturation zones on opposite sides of an active region for configuration similar to the embodiment of FIG. 20.

Figure 30:
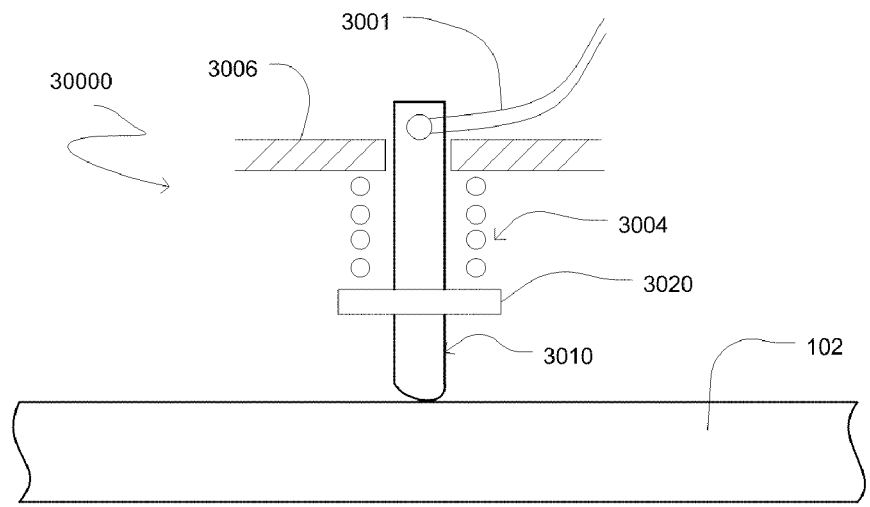
FIG. 30 diagrammatically illustrates one embodiment of a contact pin.
Figure 31:
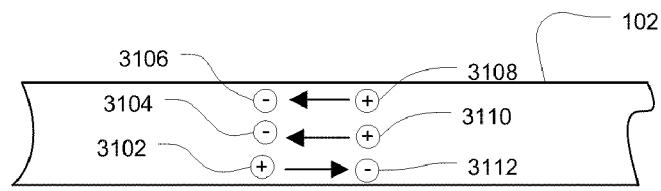
FIG. 31 is a view of a shaft and a plurality of contact pins in contact with the shaft in a first exemplary configuration for establishing magnetized active region in the shaft.
Figure 32:
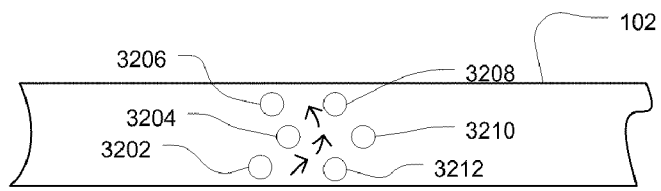
FIG. 32 is a view of a shaft and a plurality of contact pins in contact with the shaft in a second exemplary configuration for establishing magnetized active region in the shaft.

Turning now to FIGS. 30-32 contact pins, instead of electrode clamps, may be used to establish current flow forming one or more active regions consistent with any embodiment consistent with the present disclosure. Contact pins may be used to establish any desired magnetization in a shaft. FIG. 30 illustrates one exemplary embodiment of a contact pin 3000 that may be utilized to provide a conductive contact point for passing current through the shaft. The pin 3000 may include a nonconductive fixture plate 3006 and a conductive contact pin 3010. A spring 3004 may be provided between a portion of the nonconductive fixture plate 3006 and a portion 3020 of the conductive contact pin 3010 to bias the contact pin 3010 against the shaft 102.

As illustrated for example in FIG. 31, contact pins, e.g. pins 3102, 3104, 3106, 3108, 3110 and 3112, may be coupled around the shaft to establish current flow in the direction of the arrows, similar to the embodiment of FIG. 15. The embodiment of FIG. 31 may also be used to establish an elliptical magnetization by arranging pairs of pins at an angle to each other and sequentially passing current through the shaft between the associated pairs. Contact pins may be used to establish any signature magnetization in a shaft. FIG. 32 illustrates one exemplary embodiment including six conductive pins providing six contact points 3202, 3204, 3206, 3208, 3210, and 3212, respectively, on the surface of the shaft to establish a unique magnetic signature. A current source may be programmed to sequentially pass current through selected pairs of the contact pins to create a magnetic signature in the shaft, e.g. in the direction of the illustrated arrows. The magnetic signature may be utilized to make additional non-torque measurements such as speed of rotation measurements. The magnetic signature may provide several poles in one revolution of the shaft to provide additional resolution in speed sensing. The magnetic signature may also create a time varying signal which may be different from a sine/cosine signal and which can be uniquely differentiated from sinusoidal noise.

Figure 33:
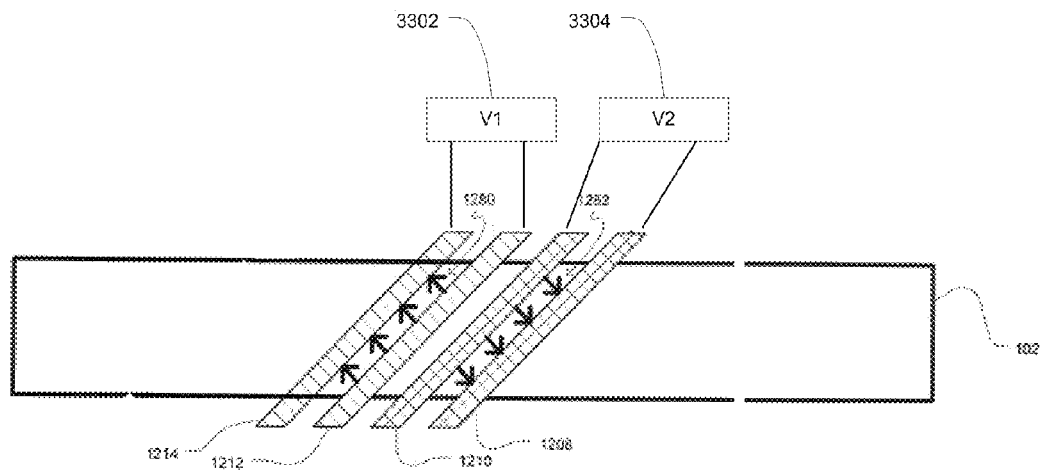
FIG. 33 diagrammatically illustrates one exemplary system and method for providing unbalanced currents for establishing first and second active regions in a shaft consistent with the present disclosure.

Again, embodiments consistent with the disclosure may use a single or multiple current sources for magnetizing one or more active regions in a shaft. In any embodiment consistent with the present disclosure, separate sources may be used to balance or deliberately un-balance the magnetizing currents, e.g. for adjusting sensor gain and offset (output at zero torque). As shown for example in FIG. 33, separate sources 3302 and 3304 may be applied to establish magnetization zones in the shaft, as described in FIG. 12. Torque may then be measured to determine the established offset and gain. If the desired offset and gain are not established the outputs of the sources, e.g. V1 and/or V2, may be modified and offset and gain may measured. This process may be repeated until the desired offset and gain are achieved. This approach may be used to eliminate the need to match specific shafts to specific associated sensors.

Once a shaft is magnetized consistent with the present disclosure, the shaft may be mechanically conditioned to stabilize the shaft and/or to adjust gain and offset. In one embodiment, controlled mechanical shock pulses imparted to the shaft by vibration impact device may be used to stabilize the shaft. In another embodiment, segmented demagnetizing solenoid coils may be used to tune the shaft after magnetization.

Figures 34, 35:
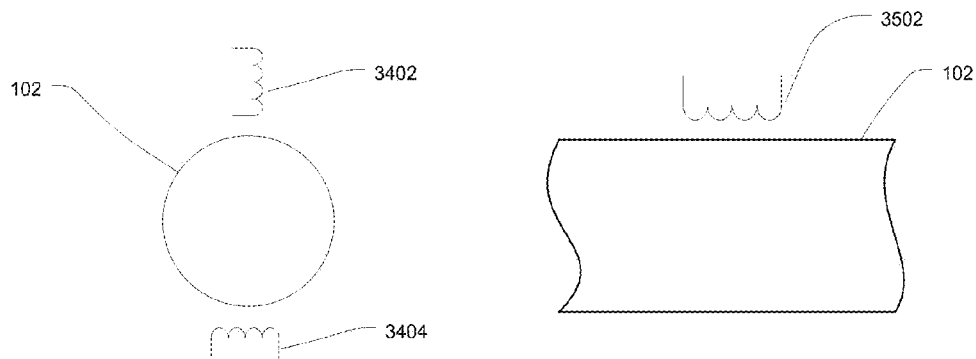
FIG. 34 diagrammatically illustrates radially and tangentially oriented flux gate coils consistent with the present disclosure.
FIG. 35 diagrammatically illustrates an axially oriented flux gate coils consistent with the present disclosure.

In any embodiment consistent with the present disclosure, magnetic field components associated with one or more active regions may be sensed by one or more magnetic field sensors positioned adjacent the shaft. In an embodiment wherein the sensors are configured as flux gate sensors, the flux gate coils may positioned in a radial, axial and/or tangential relationship to the shaft. FIG. 34 illustrates a radially oriented flux gate coil 3402 and a tangentially oriented flux gate coil 3404, and FIG. 35 illustrates an axially oriented flux gate coil 3502. Each coil may provide a separate sinusoidal output indicative of torque on the shaft, shaft rotational speed and/or shaft position.

Figure 36:
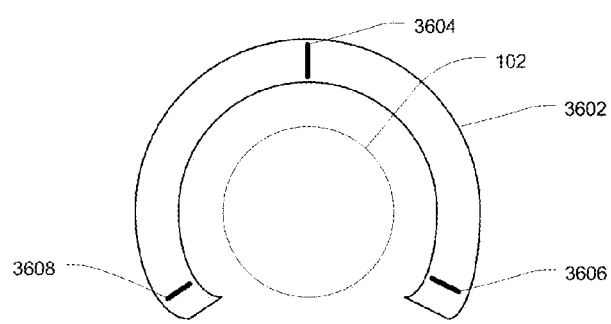
FIG. 36 diagrammatically illustrates an exemplary housing for positioning three flux gate coils around a shaft consistent with the present disclosure.
Figure 37:
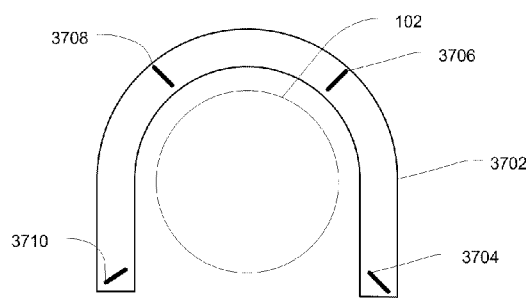
FIG. 37 diagrammatically illustrates an exemplary housing for positioning four flux gate coils around a shaft consistent with the present disclosure.

In general, one or more tangential and/or radial coils may be used to sense torque while maintaining a small sensor package size. In one embodiment, use of three radial coils may allow torque measurement while rejecting common mode fields. As shown, for example, in FIG. 36, three radial coils 3604, 3606 and 3608 may be disposed in a housing 3602 that is slipped over the shaft 102 to place the coils in proximity to the shaft for sensing fields generated in an active region as the shaft rotates. The sum of the outputs from the three coils 3604, 3606 and 3608 may be taken as an indication of torque, while the combined effect of a constant field on the coils results in cancellation of any common mode field component. In another embodiment, four coils 3704, 3706, 3708 and 3710 may be disposed in a housing that is slipped over the shaft 102, as shown for example in FIG. 37. Modifying the spacing of the coils in the embodiment of FIG. 37 allows for adjustment of gain and offset.

A sensor consistent with the present disclosure may produce a sinusoidal output where the amplitude of sinusoidal output is proportional to torque. Magnetic sensor elements, e.g. flux gate coils, may be arranged to provide sine and cosine signals as the shaft rotates. DC fields may be rejected from measurements by AC coupling the outputs in a magnetometer. Also, trigonometric relationships may be implemented in the magnetometer with respect to the sine and cosine outputs to determine torque and position. In particular, torque may be determined by $$\text{torque}=\sqrt{(\sin^2+\cos^2)}$$

and position may be determined by $$\text{position}=\arctan(\sin/\cos).$$

Since the $\sqrt{/(\sin^2+\cos^2)}$ only produces positive numbers, a system consistent with the disclosure may include a method to produce a negative output when negative torque is measured. In one embodiment, a position sensor may be used to determine the direction of instantaneous rotational angle change. If the instantaneous angle change is in a positive direction, then torque will have a first predetermined polarity. If the instantaneous angle is in a negative direction, then torque will have a polarity opposite to the first polarity. A system consistent with the present disclosure may also, or alternatively, use a DC average of signal picked up by specific coil placement. If DC average of a sinusoid (torque dependent) is positive, then torque may be considered positive. If the DC average is negative, then torque may be considered negative.

The sine/cosine relationship may allow use of one set of electronics (for example one ASIC) for obtaining position and torque. Rotational speed may be obtained from one of the sinusoids, e.g. by counting the rate of occurrence of the peak amplitude. The sine/cosine relationship may also be used for diagnostics. Any departure from the sensed sin/cosine relationship may trigger a diagnostics signal.

A sensor consistent with the present disclosure may also include an anti-aging algorithm. Magnets (soft or hard material) may age with time and temperature. Aging of the magnets and other system components, environmental effects, air gap variations between the shaft and sensor, etc. can cause changes in the sensor output. These aging changes may be small and acceptable in many applications, but in certain critical application this may not be acceptable. A sensor consistent with the present disclosure may correct the sinusoidal amplitudes (or the resulting calculated torque) based on a reference signal from one or more anti-aging coils that provide an output that does not change significantly with torque. For example, the magnetized zone 2704 used to measure position in the embodiment of FIG. 27 may produce a sinusoidal output having an amplitude that does not change with applied torque but changes with aging. Likewise, the output of an axial coil may change only slightly with torque but may change more significantly with aging. Such an output may be used as a reference signal to correct sensor torque output with aging. For example, the amplitude of the sensor torque output may be maintained in a constant ratio to the reference signal. Any embodiment consistent with the present disclosure may incorporate an anti-aging algorithm using a sensor output that does not vary with torque.

Figure 38:
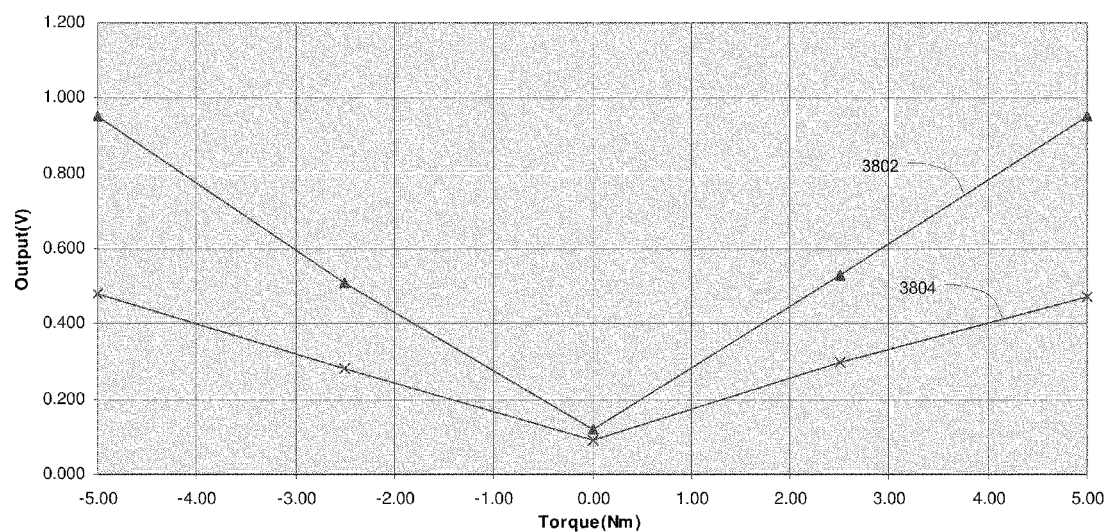
FIG. 38 is a plot of sensor output vs. torque for an exemplary sensor consistent with the present disclosure.
Figure 39:
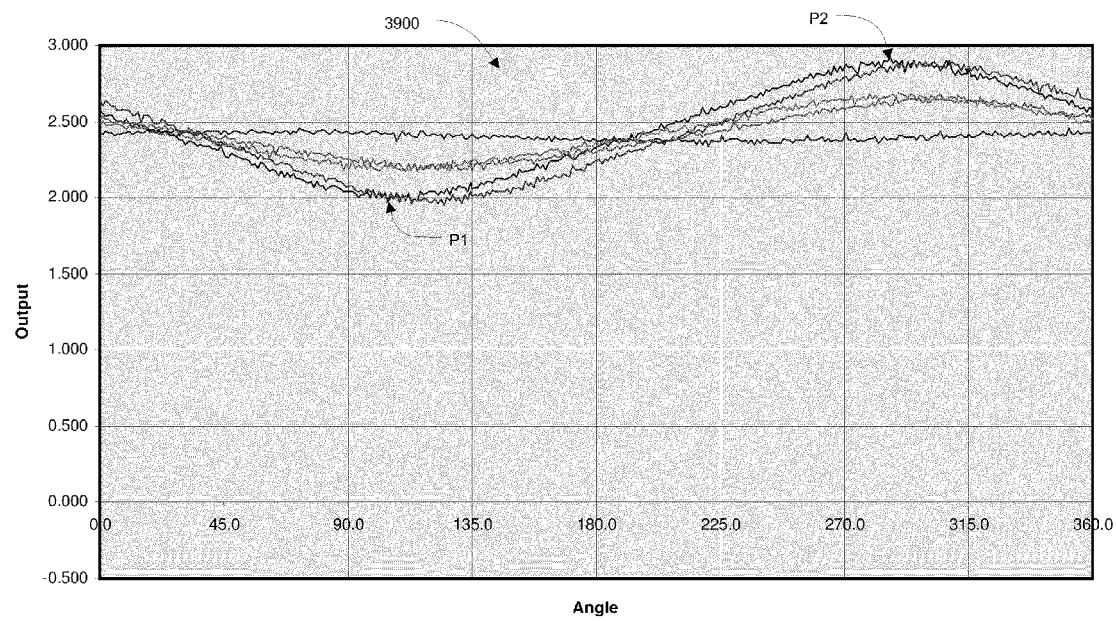
FIG. 39 is a plot of sensor output vs. shaft rotational angle for an exemplary sensor consistent with the present disclosure.
Figure 40:
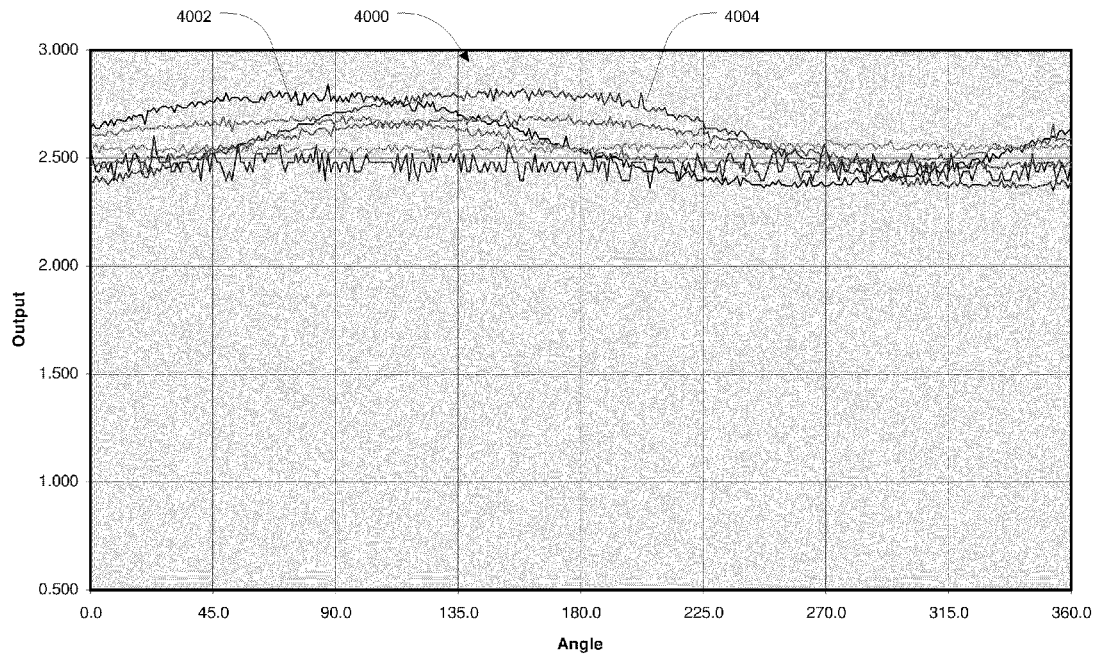
FIG. 40 is a plot of sensor output vs. shaft rotational angle for an exemplary sensor consistent with the present disclosure.

Turning now to FIGS. 38-40 there are provide plots of sensor output vs. torque and rotational angle for an embodiment including a single magnetized active region magnetized as shown in FIG. 20 and including first and second radial field coils on opposite sides of the active zone and first and second tangential coils on opposite sides of the active zone. The each of the coils may be centered in the active region with the coil center line disposed at about 6 mm from the shaft surface. Differential measurements of the radial and tangential coil outputs may be used to reject common mode fields.

Plot 3802 in FIG. 38 illustrates peak-to-peak output amplitude vs. applied torque for sinusoidal output derived from the radial coils and plot 3804 illustrates the peak-to-peak output amplitude vs. applied torque for the sinusoidal output derived from the tangential coils. As shown, output varies substantially linearly with applied torque for both the radial and tangential coils.

FIG. 39 includes plots 3900 of the radial coil sinusoidal output vs. shaft rotational angle for applied torques of −5.0 NM, −2.5 NM, 0 NM, 2.5 NM, and 5.0 NM. The plots exhibit increasing peak-to-peak amplitude with increasing torque. FIG. 40 includes plots 4000 of the tangential coil sinusoidal output vs. shaft rotational angle for applied torques of −5.0 NM, −2.5 NM, 0 NM, 2.5 NM, and 5.0 NM. The plots exhibit increasing peak-to-peak amplitude with increasing torque, as well as a phase shift between different torque values. For example, plot 4004 is associated with an applied torque of 5.0 NM and plot 4004, which is shifted in phase from plot 4002, is associated with an applied torque of −5.0 NM.

The peak-to-peak amplitude of the coil output, e.g. from P1 to P2 in FIG. 39, varies substantially linearly with applied torque, but is independent of the overall signal average (i.e. whether the signal has a D.C. offset) and is not effected by common mode fields. As discussed above with respect to FIG. 12, therefore, common mode rejection can be achieved in a sensor consistent with the present disclosure including only one coil. In one embodiment, as the shaft is rotating, the sensor electronics can make successive peak-to-peak amplitude measurements and examine the change in peak-to-peak amplitude, which is indicative of torque applied to the shaft. Any D.C. offset in the output is ignored, thereby rejecting common mode fields. The alternating, e.g. sinusoidal, output of the coil can thus be converted to a sensor output indicative of torque, while rejecting common mode fields, by providing an output representative of the change in peak-to-peak amplitude, the average amplitude, root mean square (RMS) amplitude, etc. Using a single coil to sense torque allows for small sensor size.

According to one aspect of the disclosure, there is provided a sensor including a shaft having at least one magnetized active region having at least partially opposing magnetic polarizations; and a magnetic sensor positioned adjacent the active region. The sensor may be configured to provide a sinusoidal output in response to the opposing magnetic polarizations as the shaft rotates. The sinusoidal output may be representative of a torque applied to the shaft.

According to another aspect of the disclosure, there is provided a method of inducing a magnetization in a magnetorestrictive shaft used in a sensor system for monitoring torque applied to the shaft including, the method including directing a current through an axial extent of the shaft in a direction that is not a single axial direction.

According to yet another aspect of the disclosure there is provided a sensor including a shaft having at least one active region having an elliptical magnetization; and a magnetic sensor configured to sense a magnetic field about the shaft. The magnetic field may be representative of a torque applied to the shaft.

According to yet another aspect of the disclosure there is provided a sensor including a shaft having at least one magnetized active region; a first fluxgate coil positioned about the shaft and coupled to a first magnetometer and configured to provide a first sinusoidal signal as the shaft is rotated; a second fluxgate coil positioned about the shaft configured to provide a second sinusoidal signal as the shaft is rotated, the second sinusoidal signal being ninety degrees out of phase with the first sinusoidal signal; and torque circuitry configured to accept the first and second sinusoidal signals and provide an output signal representative of torque applied to the shaft.

According to another aspect of the disclosure, there is provided a sensor including a shaft formed from a magnetorestrictive material and having at least one magnetized active region in an axial extent of the shaft, the at least one active region having at least partially opposing magnetic polarizations in a radial cross-section taken in the axial extent; and only one magnetic sensor positioned adjacent the active region and configured to sense each of the opposing magnetic polarizations. The sensor provides an output in response to the opposing magnetic polarizations, the output varying with the rotational angle of the shaft and a peak-to-peak amplitude of the output being representative of a torque applied to the shaft.

According to another aspect of the disclosure there is provided a method of sensing torque applied to a rotating shaft, the method including: establishing at least one magnetized active region in an axial extent of the shaft, the at least one active region having at least partially opposing magnetic polarizations in a radial cross-section taken in the axial extent; positioning only one magnetic sensor adjacent the active region and configured to sense each of the opposing magnetic polarizations and provide an output in response to the opposing magnetic polarizations, the output varying with the rotational angle of the shaft; and monitoring an amplitude of the output as the shaft rotates, the amplitude being representative of a torque applied to the shaft.

According to another aspect of the disclosure there is provided a method of compensating for aging effects in a torque sensor including a magnetic sensor that provides a torque output representative of torque applied to a shaft, the method including: positioning an anti-aging magnetic sensor adjacent the shaft for sensing a magnetic polarization in the shaft and providing a reference signal output that is substantially independent of torque applied to the shaft; and adjusting the torque output in response to the reference signal.

Other aspects are set forth in the preceding description and associated drawings. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Also, the various features and aspects disclosed herein may be combined with one another. All such variations and combinations are contemplated within the scope of the present disclosure. Other modifications, variations, and alternatives are also possible. Accordingly, the claims are intended to cover all such equivalents.

What is claimed is:

1. A sensor comprising:
    a shaft formed from a magnetorestrictive material and having at least one magnetized active region disposed between first and second passive regions in an axial extent of said shaft, said at least one active region having at least partially opposing magnetic polarizations in a radial cross-section taken in said axial extent; and
    only one magnetic sensor positioned adjacent said active region and configured to sense each of said opposing magnetic polarizations and provide an output in response to said opposing magnetic polarizations, said output varying with the rotational angle of said shaft and a peak-to-peak amplitude of said output being representative of a torque applied to said shaft.

2. The sensor of claim 1, wherein said magnetic sensor comprises a flux gate sensor.

3. The sensor of claim 2, wherein said fluxgate sensor comprises a coil that is radially oriented relative to said shaft.

4. The sensor of claim 2, wherein said fluxgate sensor comprises a coil that is tangentially oriented relative to said shaft.

5. The sensor of claim 2, wherein said fluxgate sensor comprises a coil that is axially oriented relative to said shaft.

6. The sensor of claim 1, wherein said shaft is a tubular shaft.

7. A method of sensing torque applied to a rotating shaft, said method comprising:
    establishing at least one magnetized active region disposed between first and second passive regions in an axial extent of said shaft, said at least one active region having at least partially opposing magnetic polarizations in a radial cross-section taken in said axial extent;
    positioning at least one magnetic sensor adjacent said active region and configured to sense each of said opposing magnetic polarizations and provide an output in response to said opposing magnetic polarizations, said output varying with the rotational angle of said shaft; and
    monitoring an amplitude of said output as said shaft rotates, said amplitude being representative of a torque applied to said shaft.

8. The method of claim 7, wherein said amplitude is a peak-to-peak amplitude.

9. The method of claim 7, wherein amplitude is a root mean square amplitude.

10. The method of claim 7, wherein said at least one magnetic sensor comprises a flux gate sensor.

11. The method of claim 10, wherein said fluxgate sensor comprises a coil that is radially oriented relative to said shaft.

12. The method of claim 10, wherein said fluxgate sensor comprises a coil that is tangentially oriented relative to said shaft.

13. The method of claim 7, wherein said shaft is a tubular shaft.

14. The method of claim 7, said method further comprising:

positioning an anti-aging magnetic sensor adjacent said shaft for sensing each of said opposing magnetic polarizations and providing a reference signal output that is substantially independent of said torque applied to said shaft; and adjusting said output in response to said reference signal output.

15. The method of claim 14, wherein said anti-aging magnetic sensor comprises a fluxgate sensor.

16. The method of claim 15, wherein said fluxgate sensor comprises a coil that is axially oriented relative to said shaft.

17. The method of claim 14, wherein said adjusting comprises maintaining a constant ratio of an amplitude of said output to said reference signal output.

* * * * *